(12) United States Patent
Kim

(10) Patent No.: US 9,013,368 B1
(45) Date of Patent: Apr. 21, 2015

(54) FOLDABLE MOBILE DEVICE AND METHOD OF CONTROLLING THE SAME

(71) Applicant: LG Electronics Inc., Seoul (KR)

(72) Inventor: Yongsin Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/193,332

(22) Filed: Feb. 28, 2014

(30) Foreign Application Priority Data

Oct. 7, 2013 (KR) .......................... 10-2013-0119204

(51) Int. Cl.
*G06F 3/041* (2006.01)
*G09G 5/00* (2006.01)
*G06F 3/14* (2006.01)

(52) U.S. Cl.
CPC ...................................... *G06F 3/1446* (2013.01)

(58) Field of Classification Search
USPC ................. 345/173–178, 1.1, 1.2, 1.3
See application file for complete search history.

(56) References Cited

U.S. PATENT DOCUMENTS

| | | | | |
|---|---|---|---|---|
| 2010/0225664 A1* | 9/2010 | Ogasawara | ................... | 345/619 |
| 2011/0080702 A1 | 4/2011 | Ladouceur et al. | | |
| 2011/0090155 A1* | 4/2011 | Caskey et al. | ................. | 345/173 |
| 2011/0143769 A1 | 6/2011 | Jones et al. | | |
| 2012/0007854 A1* | 1/2012 | Cho | .............................. | 345/419 |
| 2012/0280924 A1 | 11/2012 | Kummer et al. | | |
| 2013/0229324 A1* | 9/2013 | Zhang et al. | .................... | 345/1.3 |
| 2013/0314302 A1* | 11/2013 | Jeung et al. | .................... | 345/2.3 |
| 2013/0321340 A1* | 12/2013 | Seo et al. | ....................... | 345/174 |
| 2014/0055376 A1* | 2/2014 | Baek et al. | ..................... | 345/173 |
| 2014/0085237 A1* | 3/2014 | Choi | .............................. | 345/173 |

FOREIGN PATENT DOCUMENTS

| | | |
|---|---|---|
| EP | 2565751 A1 | 3/2013 |
| KR | 10-2010-0099587 A | 9/2010 |
| KR | 10-2012-0117107 A | 10/2012 |

OTHER PUBLICATIONS

An International Search Report for Appl. No. PCT/KR2014/001749 dated Jun. 18, 2014.

* cited by examiner

*Primary Examiner* — Kent Chang
*Assistant Examiner* — Nelson Rosario
(74) *Attorney, Agent, or Firm* — Birch, Stewart, Kolasch & Birch, LLP

(57) ABSTRACT

A foldable mobile device and a method for controlling a display of the same are disclosed herein. Herein, the foldable mobile device includes a first display unit configured to display a first image or a first zoomed-in first image while the foldable mobile device is in a folded state, a second display unit configured to display a second image corresponding to a predetermined display mode or a second image including a second zoomed-in first image when the foldable mobile device is unfolded, and a controller configured to control a display of the first display unit and the second display unit.

20 Claims, 18 Drawing Sheets

FOLDABLE MOBILE DEVICE AND METHOD OF CONTROLLING THE SAME

Pursuant to 35 U.S.C. §119(a), this application claims the benefit of earlier filing date and right of priority to Korean Application No. 10-2013-0119204, filed on Oct. 7, 2013, the contents of which are hereby incorporated by reference herein in their entirety.

BACKGROUND OF THE INVENTION

1. The Field

The present specification relates to a mobile device and a method of controlling the same and, more particularly, to a device and method of controlling a display of an image in a foldable mobile device.

2. Description of the Related Art

Generally, a display device using a flat display panel, such as liquid crystal display (LCD), field emission display (FED), plasma display panel (PDP), OLED (organic light-emitting diode), and so on, is mostly applied to televisions, mobile devices, and so on. At this point, in order to increase mobility, the mobile device may be fabricated to have a foldable structure. Hereinafter, the mobile device having the foldable structure will be referred to as a foldable mobile device.

Such foldable mobile device may be applied not only to diverse mobile equipments, such as a mobile phone, a Portable Multimedia Player (PMP), a navigation system, an Ultra Mobile PC (UMPC), an electronic book (e-book), an electronic newspaper, and so on, but may also be applied to diverse fields, such as TVs, monitors, and so on.

SUMMARY OF THE INVENTION

An object of the present specification is to provide a foldable mobile device and a method of controlling the same.

Another object of the present specification is to provide a foldable mobile device and a method of controlling the same that can enhance the display function of the present specification.

Yet another object of the present specification is to provide a foldable mobile device and a method of controlling the same that can effectively control an image being displayed when using a zoom function.

Additional advantages, objects, and features of the specification will be set forth in part in the description which follows and in part will become apparent to those having ordinary skill in the art upon examination of the following or may be learned from practice of the specification. The objectives and other advantages of the specification may be realized and attained by the structure particularly pointed out in the written description and claims hereof as well as the appended drawings.

In order to achieve the above-described object of the present specification, according to an exemplary embodiment of the present specification, a foldable mobile device includes a first display unit configured to include at least one display section, to display a first image in accordance with an execution of at least one application while the foldable mobile device is in a folded state, and to display a first zoomed-in first image when a zoom-in command is inputted, wherein the first zoomed-in image is that the first image is zoomed-in by a first zoom-in ratio; a second display unit configured to include one or more display sections, to display a second image corresponding to a predetermined display mode when the foldable mobile device is unfolded without having any zoom-in operations on the first display unit, and to display a second image including a second zoomed-in first image when the foldable mobile device is unfolded after the first zoomed-in first image is displayed on the first display unit, wherein the second zoomed-in first image is that the first image is zoomed-in by a second zoom-in ratio that is equal to or greater than the first zoom-in ratio; and a controller configured to determine the first zoom-in ratio and the second zoom-in ratio, and to control the foldable mobile device so that the first image is zoomed-in by the determined first zoom-in ratio and the second zoom-in ratio.

According to an embodiment of the present specification, when the first zoomed-in first image is displayed on the first display unit, and when the foldable mobile device is unfolded within a predetermined time period, the controller controls the foldable mobile device so that the second image including the second zoomed-in first image is displayed on the second display unit.

According to an embodiment of the present specification, when the first zoomed-in first image is displayed on the first display unit, and when the foldable mobile device is unfolded after a predetermined time period, the controller controls the foldable mobile device so that the second image respective to the predetermined display mode is displayed on the second display unit.

According to an embodiment of the present specification, the second image respective to the predetermined display mode corresponds to at least one icon or an image connected with the first image.

According to an embodiment of the present specification, when the first image including a map is displayed on the first display unit, when the foldable mobile device is unfolded without the zoom-in command, and when the second image respective to the predetermined display mode corresponds to the image connected with the first image, the controller controls the foldable mobile device so that a third image including the second image and Point Of Interest (POI) information can be displayed on the second display unit.

According to an embodiment of the present specification, the controller controls the foldable mobile device so that, among the first image being displayed on the first display unit, an image respective to an important location that has disappeared from the display section due to a zoom-in operation can be included in the second image, the second image being displayed on the second display unit.

According to an embodiment of the present specification, the controller controls the foldable mobile device so that, among the first image being displayed on the first display unit, an image respective to a position to which the zoom-in command is inputted is included in the second image, the second image being displayed on the second display unit.

According to an embodiment of the present specification, the controller determines the first zoom-in ratio based on the zoom-in command, and the controller determines the second zoom-in ratio based on the first zoom-in ratio.

According to an embodiment of the present specification, the controller determines the second zoom-in ratio by additionally applying at least one of a type of the first image being displayed on the first display unit, a display mode of the first display unit, and a display mode of the second display unit.

According to an embodiment of the present specification, when the second display unit has two or more display sections, the display mode of the second display unit is divided into a portrait view mode (or vertical display mode) and a landscape view mode (or horizontal display mode), in the portrait view mode, among two or more display sections, at least one display section is vertically positioned on a left side, and at least another one display section is vertically positioned on a right side, and in the landscape view mode, among two or more display sections, at least one display section is positioned on an upper portion, and at least another one display section is positioned on a lower portion.

According to an embodiment of the present specification, the second display unit displays the second image in any one of the landscape view mode and the portrait view mode based on the type of the first image and the display mode of the first display unit.

According to an embodiment of the present specification, the first image corresponds to an image having its horizontal ratio and vertical ratio determined in advance, the second display unit displays the second image in the landscape view mode when the first zoomed-in first image is displayed on the first display unit in the portrait view mode, and the second display unit displays the second image in the portrait view mode when the first zoomed-in first image is displayed on the first display unit in the landscape view mode.

According to an embodiment of the present specification, when the first image corresponds to an image having its horizontal ratio and vertical ratio undetermined, the second display unit displays the second image in any one of the landscape view mode and the portrait view mode, regardless of the display mode of the first display unit.

According to an embodiment of the present specification, the first image having its horizontal ratio and vertical ratio determined in advance corresponds to at least one of a drawing and a photo, and the first image having its horizontal ratio and vertical ratio undetermined corresponds to a map.

According to an embodiment of the present specification, when the second display unit has two or more display sections, each size of the two or more display sections is determined in accordance with a folding position of the foldable mobile device, and among the two or more display sections, at least one display section has the same size as the display section of the first display unit.

According to an embodiment of the present specification, the foldable mobile device includes a flexible mobile device that can be folded and unfolded.

According to another embodiment of the present specification, a method for controlling a display of a foldable mobile device including a first display unit and a second display unit may includes displaying a first image in accordance with an execution of at least one application on the first display unit when the foldable mobile device is in a folded state, and displaying a second image respective to a predetermined display mode on the second display unit when the foldable mobile device is unfolded without zoom-in operations on the first display unit; and displaying a first zoomed-in first image on the first display unit when a zoom-in command is inputted on the first display unit in the folded state of the foldable mobile device, wherein the first zoomed-in first image is that the first image is zoomed by a first zoom-in ratio; and displaying a second image including a second zoomed-in first image on the second display unit when the foldable mobile device is unfolded after the first zoomed-in first image is displayed on the first display unit, wherein the second zoomed-in first image is that the first image is zoomed-in by a second zoom-in ratio that is equal to or greater than the first zoom-in ratio.

According to an embodiment of the present specification, the method may further include displaying a third image including the second image and Point Of Interest (POI) information on the second display unit when the first image including a map is displayed on the first display unit, when the foldable mobile device is unfolded without the zoom-in operations on the first display unit, and when the second image respective to the predetermined display mode corresponds to an image connected with the first image.

According to yet another embodiment of the present specification, a foldable mobile device may include a first display unit configured to include one display section, and to display a first image in accordance with an execution of at least one application while the foldable mobile device is in a folded state; a second display unit configured to include at least first and second display sections and to display a second image respective to a predetermined display mode when the foldable mobile device is unfolded after the first image is displayed on the first display unit; a sensor unit configured to include at least one sensor, and to sense a folded/unfolded state of the foldable mobile device; and a controller configured to control a display of the first display unit and the second display unit based on a sensing result of the sensor unit. Herein, the controller controls the foldable mobile device so that the a third image including the second image and POI information can be displayed on the second display unit when the first image includes a map and when the second image respective to the predetermined display mode corresponds to an image connected with the first image.

According to an embodiment of the present specification, the second image respective to the predetermined display mode corresponds to at least one icon.

According to an embodiment of the present specification, the first display unit displays a first zoomed-in first image when a zoom-in command is inputted in a folded state of the foldable mobile device, the first zoomed-in first image is that the first image is zoomed-in by a first zoom-in ratio.

According to an embodiment of the present specification, the second display unit displays a second image including a second zoomed-in first image when the foldable mobile device is unfolded after the first zoomed-in first image is displayed on the first display unit, the second zoomed-in first image is that the first image is zoomed-in by a second zoom-in ratio that is equal to or greater than the first zoom-in ratio.

According to an embodiment of the present specification, when the foldable mobile device is unfolded within a predetermined time period after the first zoomed-in first image is displayed on the first display unit, the controller controls the foldable mobile device so that the second image including the second zoomed-in first image is displayed on the second display unit.

According to an embodiment of the present specification, when the first zoomed-in first image is displayed on the first display unit, and when the foldable mobile device is unfolded after a predetermined time period, the controller controls the foldable mobile device so that the second image respective to the predetermined display mode is displayed on the second display unit.

According to an embodiment of the present specification, the controller controls the foldable mobile device so that, among the first image being displayed on the first display unit, an image respective to an important location that has disappeared from the display section due to a zoom-in operation can be included in the second image, the second image being displayed on the second display unit.

According to an embodiment of the present specification, the controller controls the foldable mobile device so that, among the first image being displayed on the first display unit, an image respective to a position to which the zoom-in command is inputted can be included in the second image, the second image being displayed on the second display unit.

According to an embodiment of the present specification, when the second display unit has two or more display sections, the display mode of the second display unit is divided into a portrait view mode (or vertical display mode) and a landscape view mode (or horizontal display mode), in the portrait view mode, among two or more display sections, at least one display section is vertically positioned on a left side, and at least another one display section is vertically positioned on a right side, and in the landscape view mode, among two or more display sections, at least one display section is positioned on an upper portion, and at least another one display section is positioned on a lower portion.

According to an embodiment of the present specification, the second display unit displays the second image in any one of the landscape view mode and the portrait view mode based upon a type of the first image and a display mode of the first display unit.

According to an embodiment of the present specification, the foldable mobile device includes a flexible mobile device that can be folded and unfolded.

According to yet another embodiment of the present specification, a method for controlling a display of a foldable mobile device including a first display unit and a second display unit may include displaying a first image in accordance with an execution of at least one application on the first display unit when the foldable mobile device is in a folded state; displaying a second image respective to a predetermined display mode on the second display unit when the foldable mobile device is unfolded after the first image is displayed on the first display unit; sensing a folded/unfolded state of the foldable mobile device; and controlling a display of the first display unit and the second display unit based upon the sensed state. Herein, in the step of controlling a display, the foldable mobile device is controlled so that a third image including the second image and POI information can be displayed on the second display unit when the first image includes a map and when the second image respective to the predetermined display mode corresponds to an image connected with the first image.

It is to be understood that both the foregoing general description and the following detailed description of the present specification are exemplary and explanatory and are intended to provide further explanation of the specification as claimed.

BRIEF DESCRIPTION OF THE DRAWINGS

The accompanying drawings, which are included to provide a further understanding of the specification and are incorporated in and constitute a part of this application, illustrate embodiment(s) of the specification and together with the description serve to explain the principle of the specification. In the drawings:

(a) to (c) of FIG. 1 illustrate a perspective view of a foldable mobile device according to an exemplary embodiment of the present specification;

Figure 1:
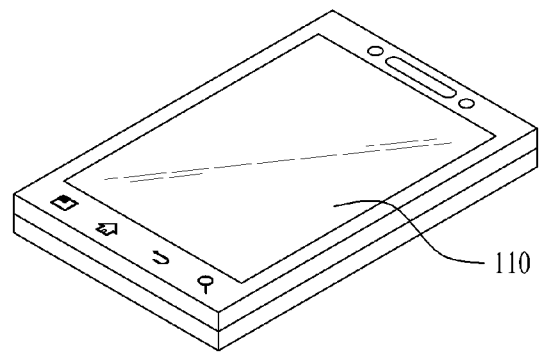
Figure 1:
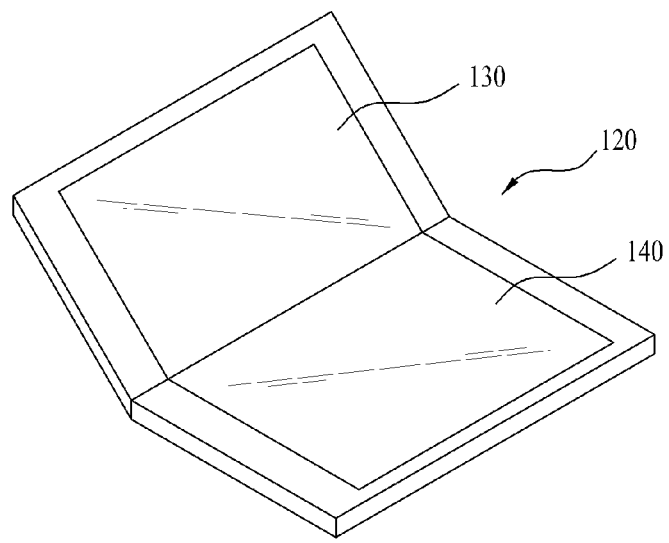
Figure 1:
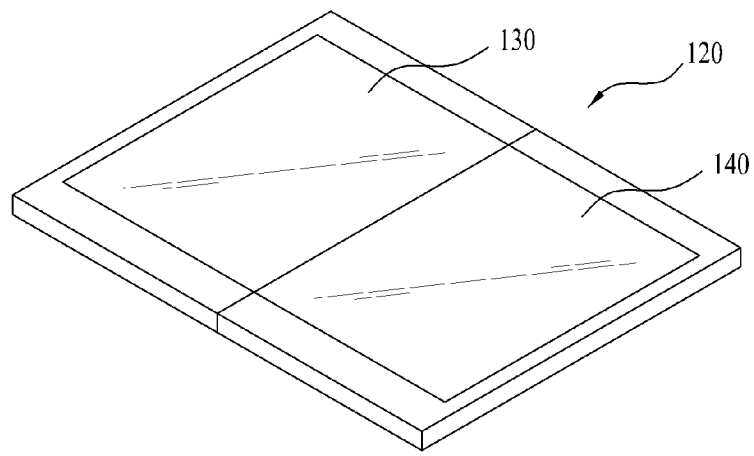
Figure 2:
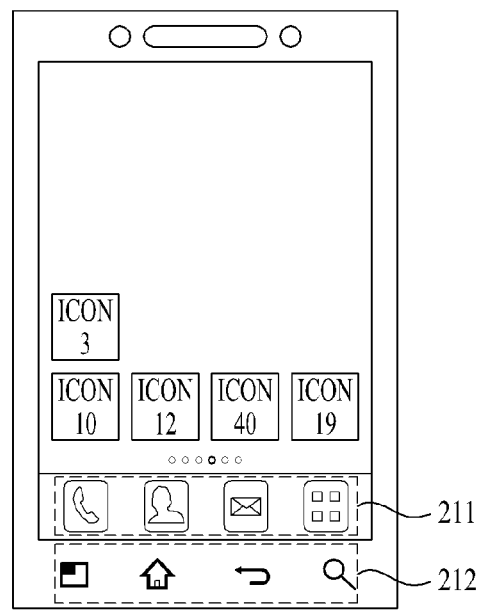
Figure 2:
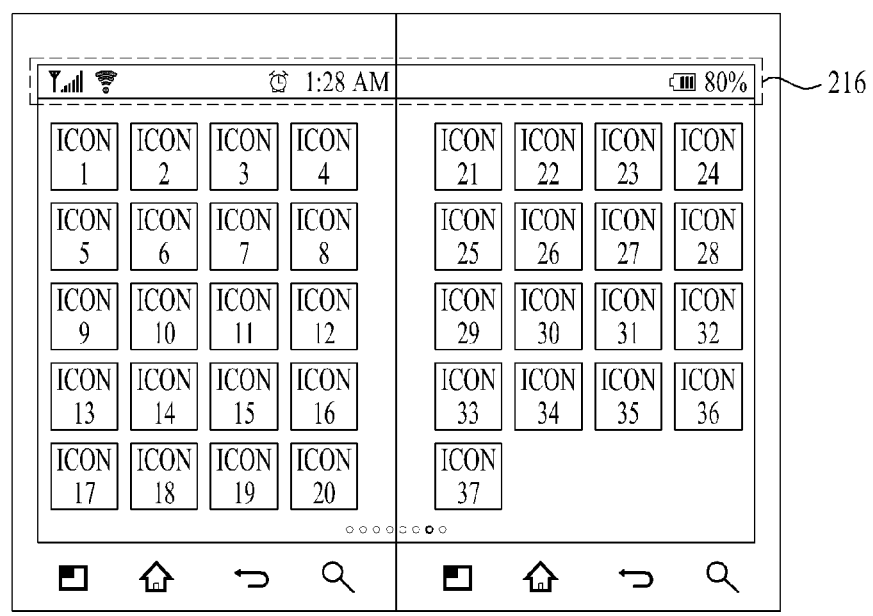
Figure 3:
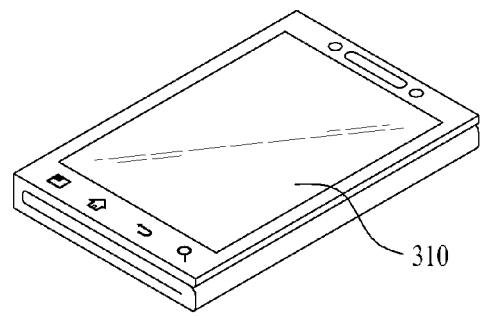
Figure 3:
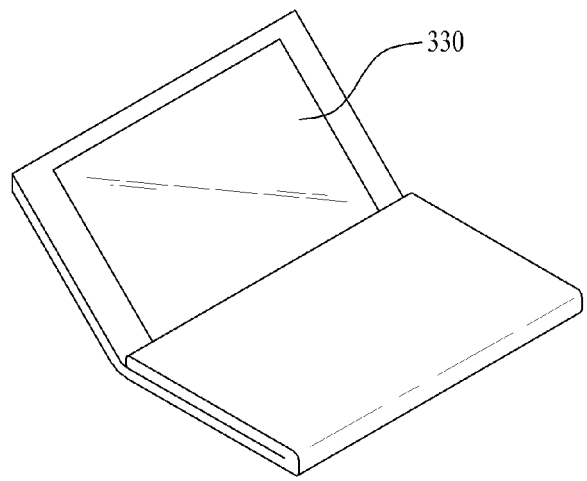
Figure 3:
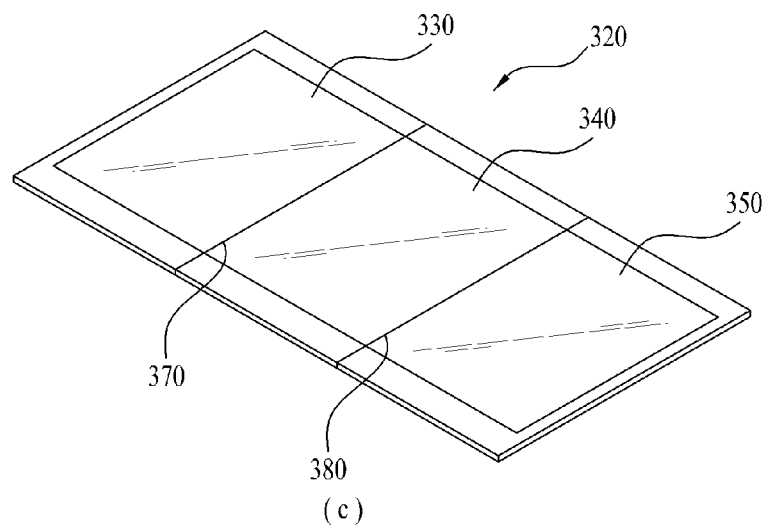
Figure 4:
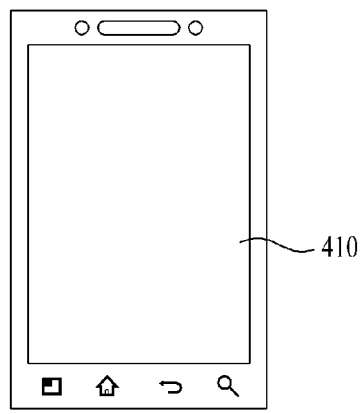
Figure 4:
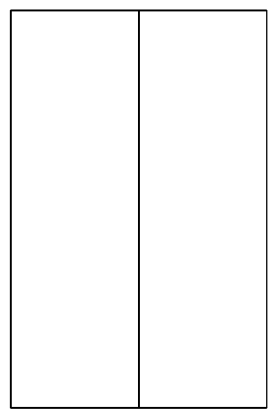
Figure 4:
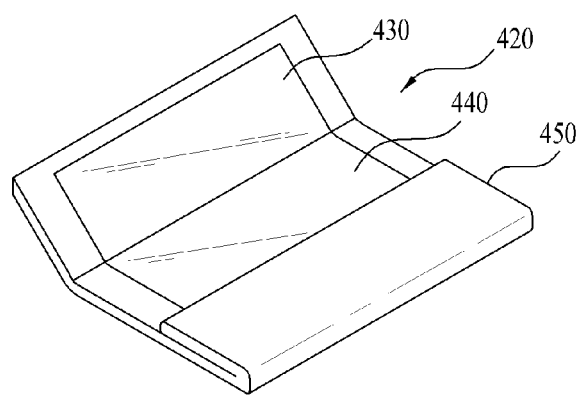
Figure 5:
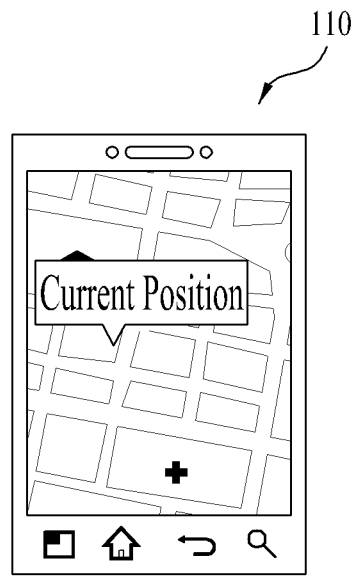
Figure 5:
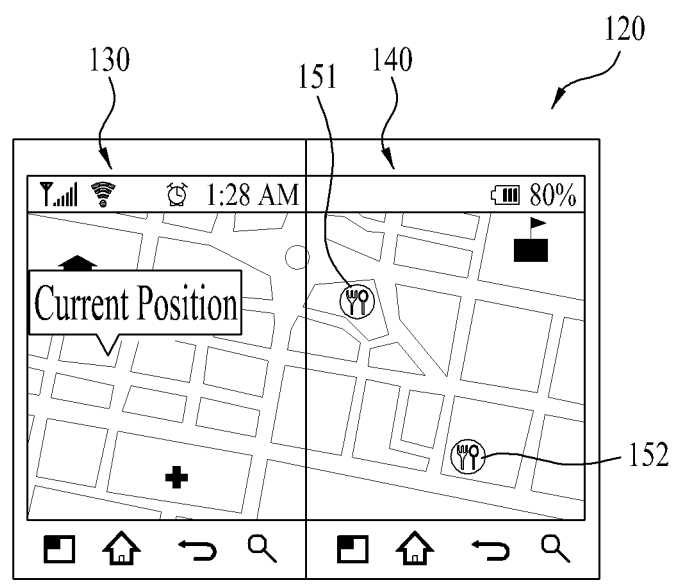
Figure 6:
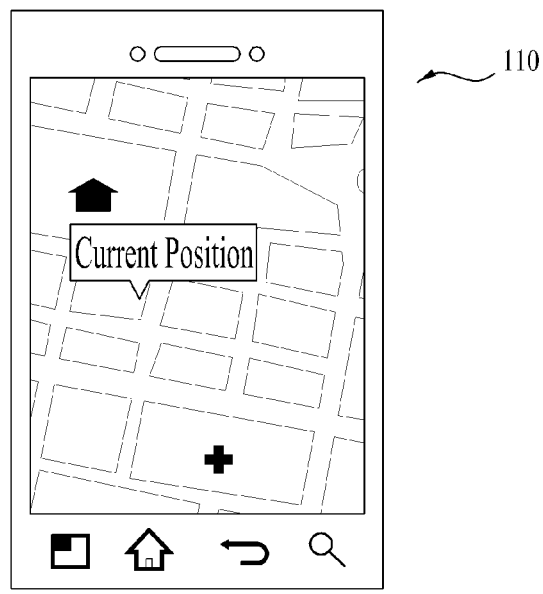
Figure 6:
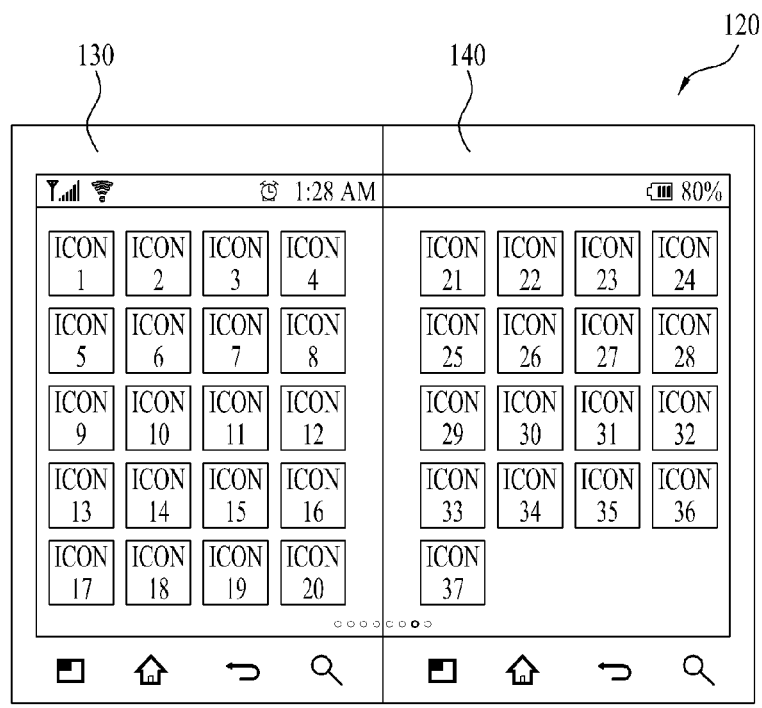
Figure 7:
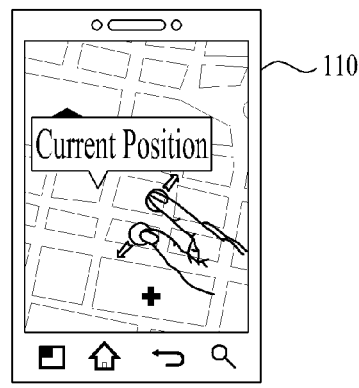
Figure 7:
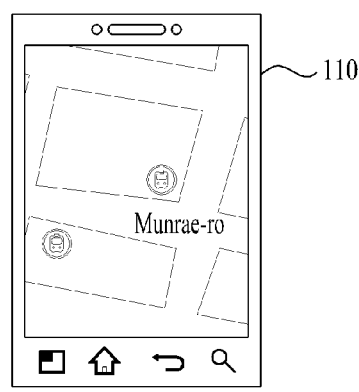
Figure 7:
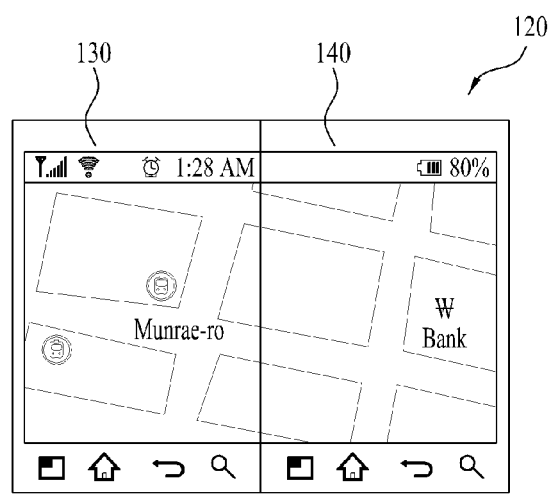
Figure 8:
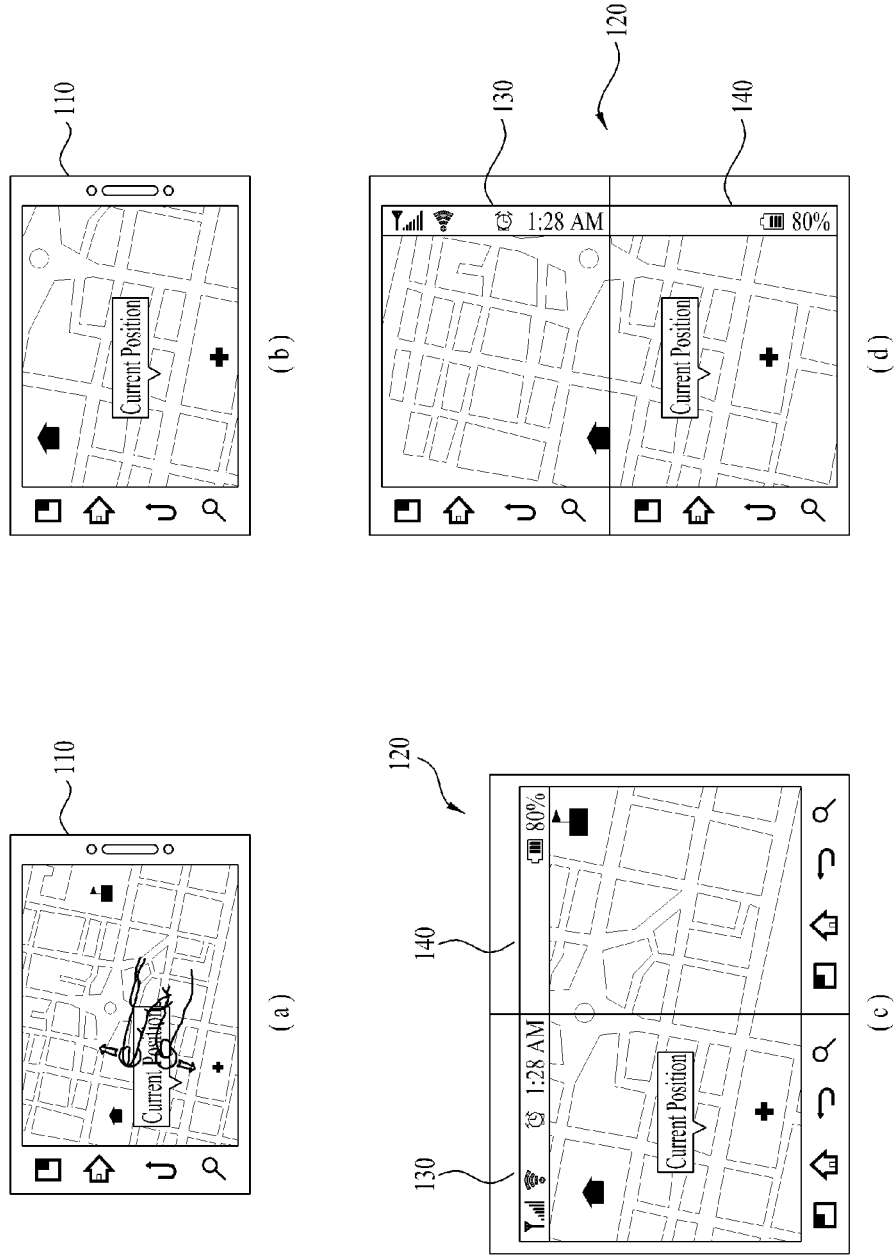
Figure 9:
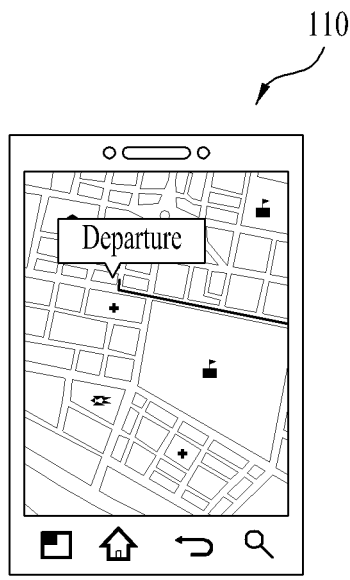
Figure 9:
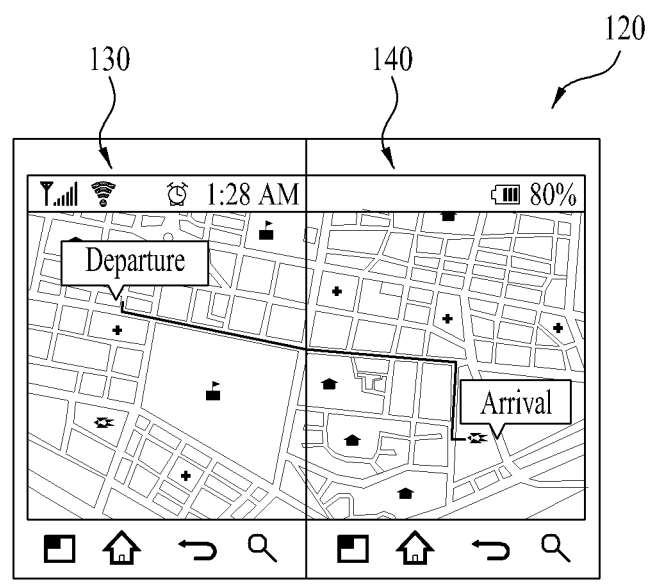
Figure 10:
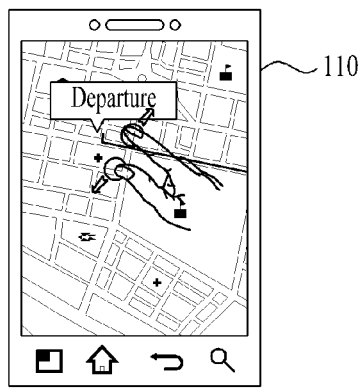
Figure 10:
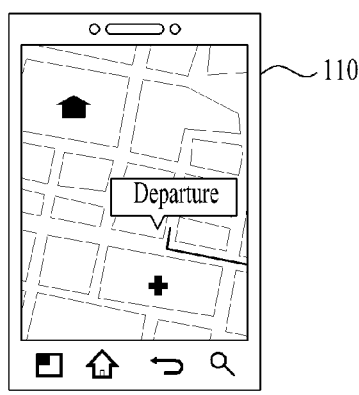
Figure 10:
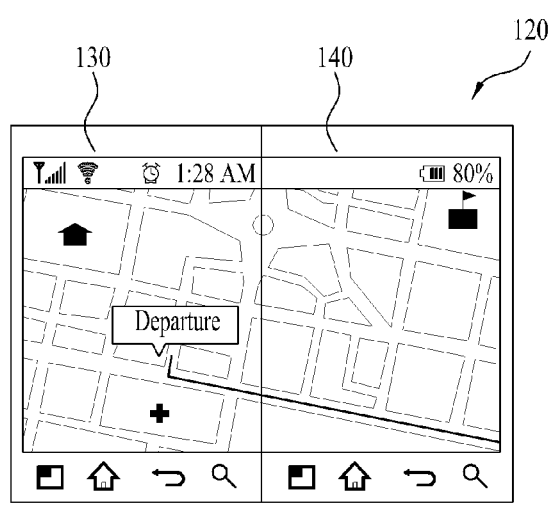
Figure 11:
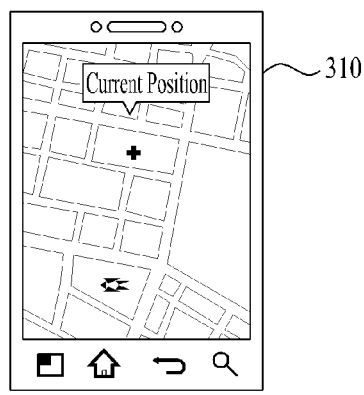
Figure 11:
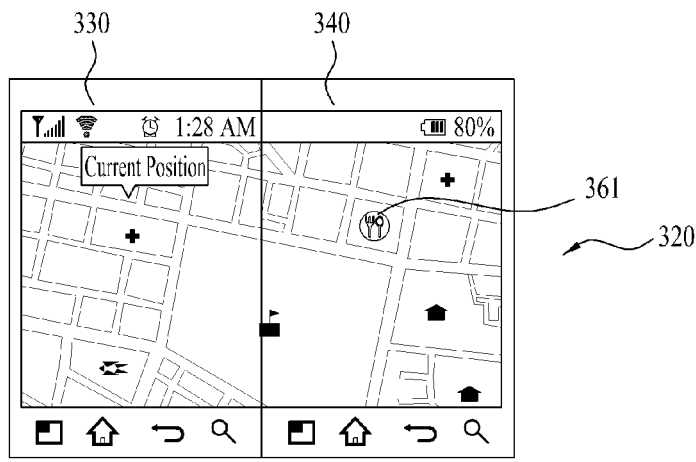
Figure 11:
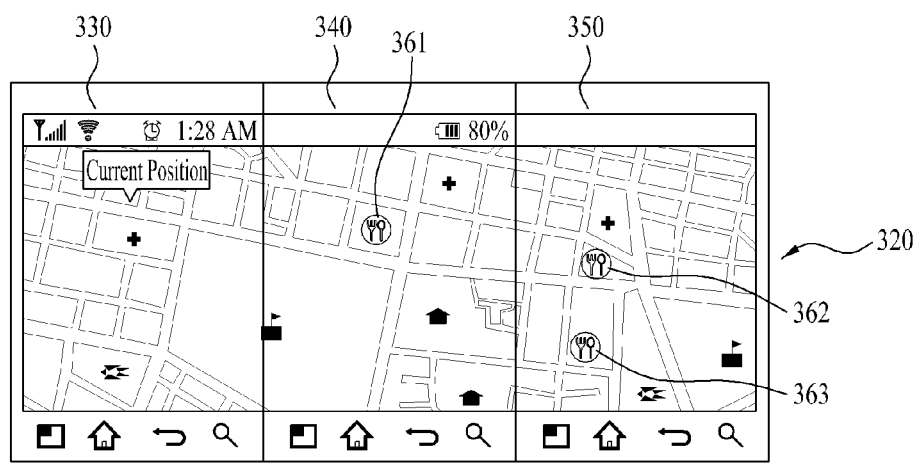
Figure 12:
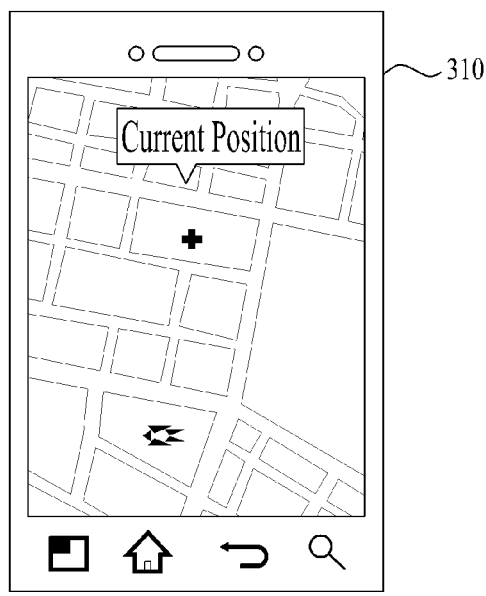
Figure 12:
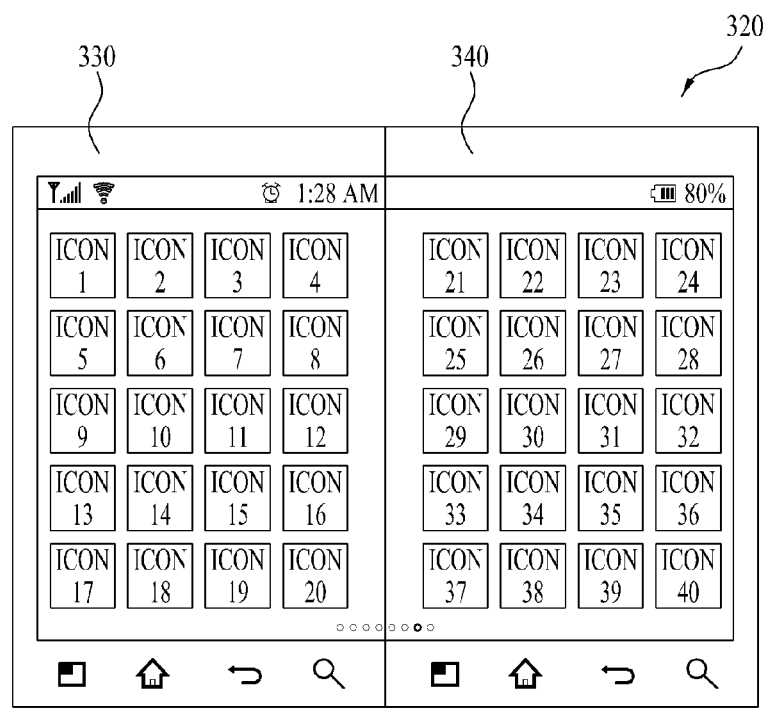
Figure 14:
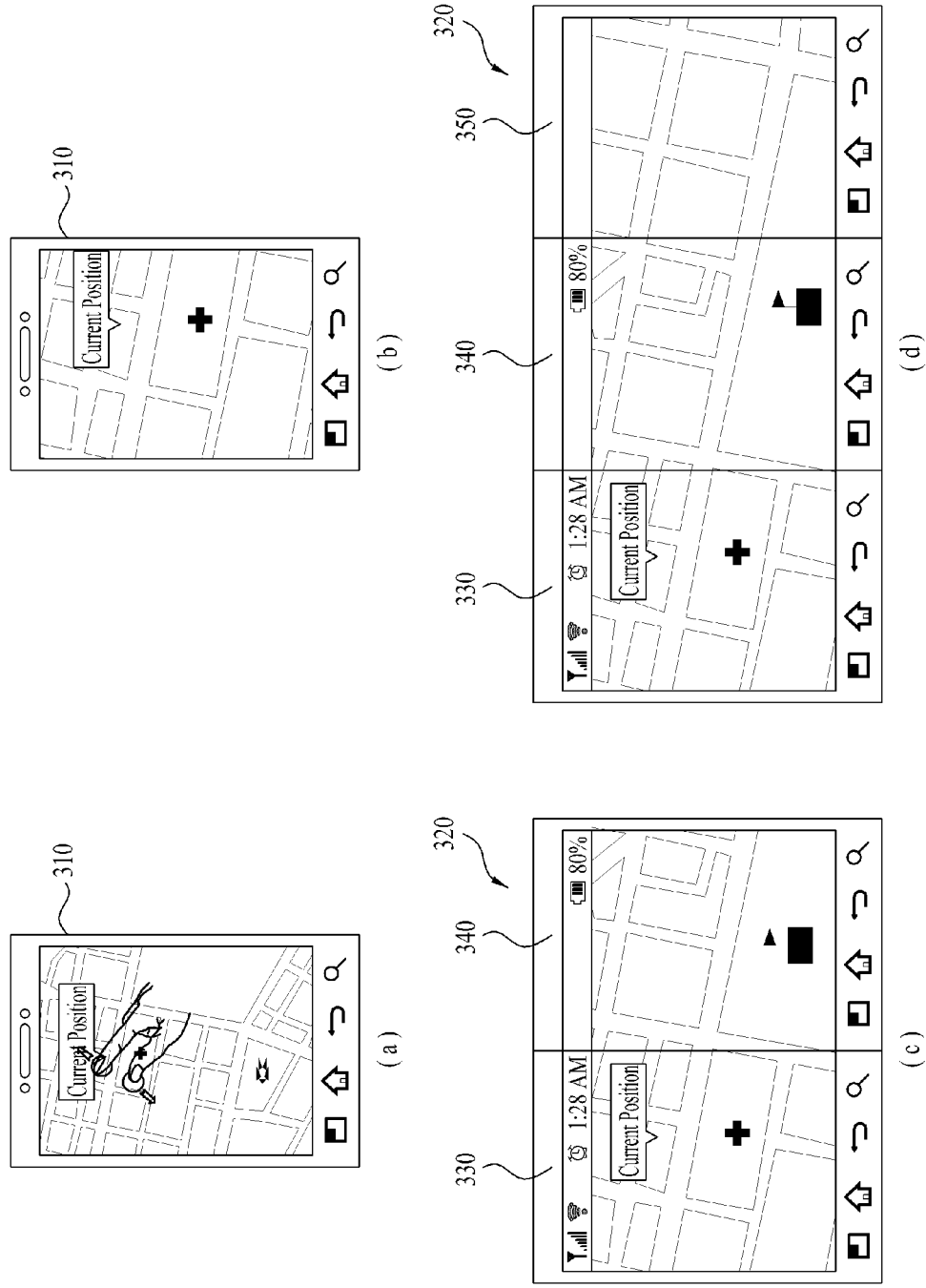
Figure 15:
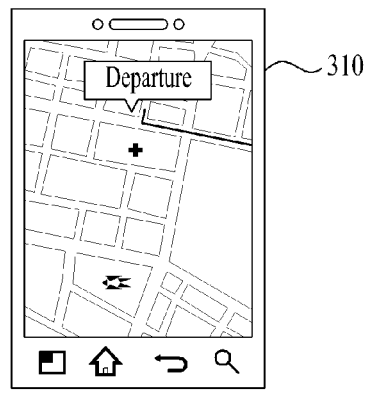
Figure 15:
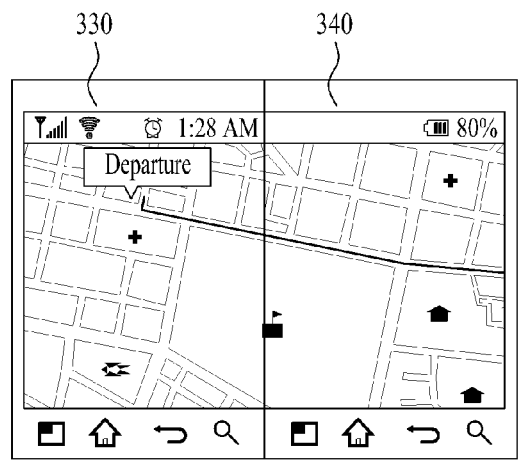
Figure 15:
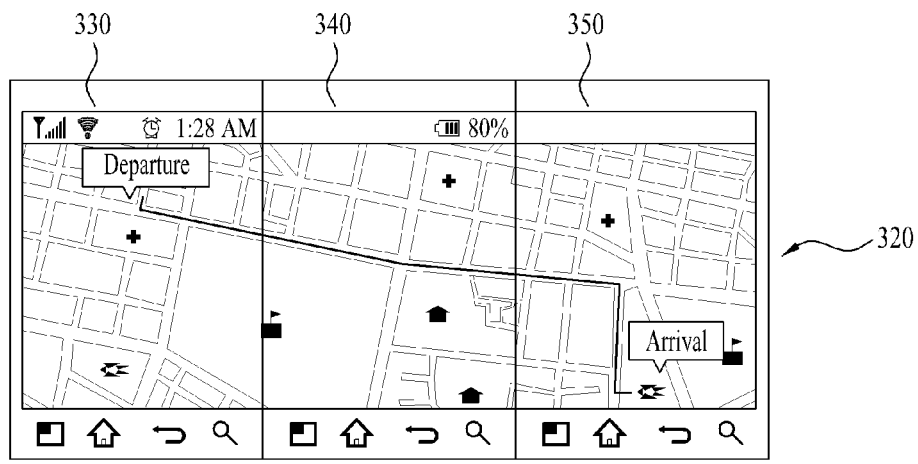
Figure 16:
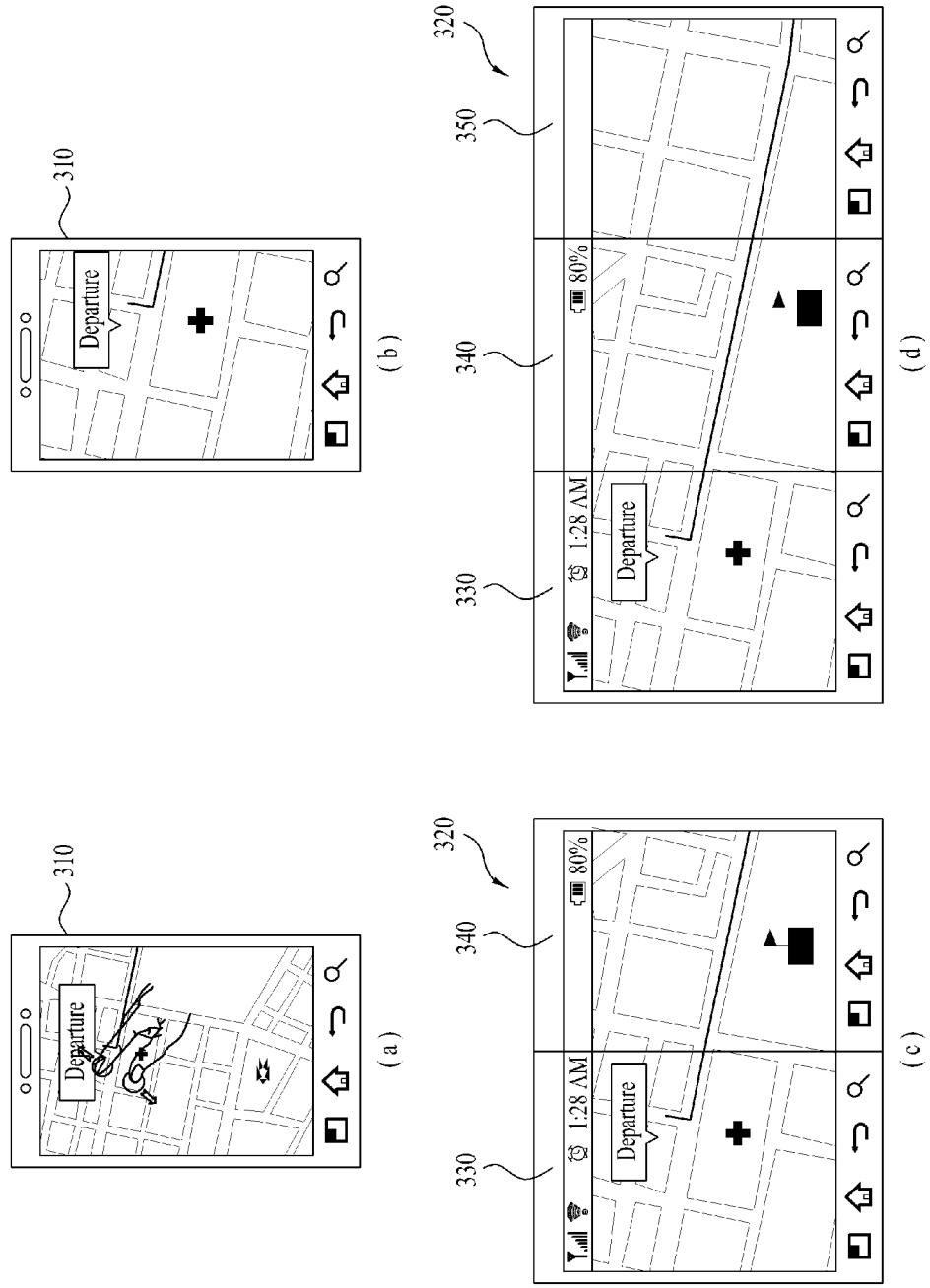
Figure 17:
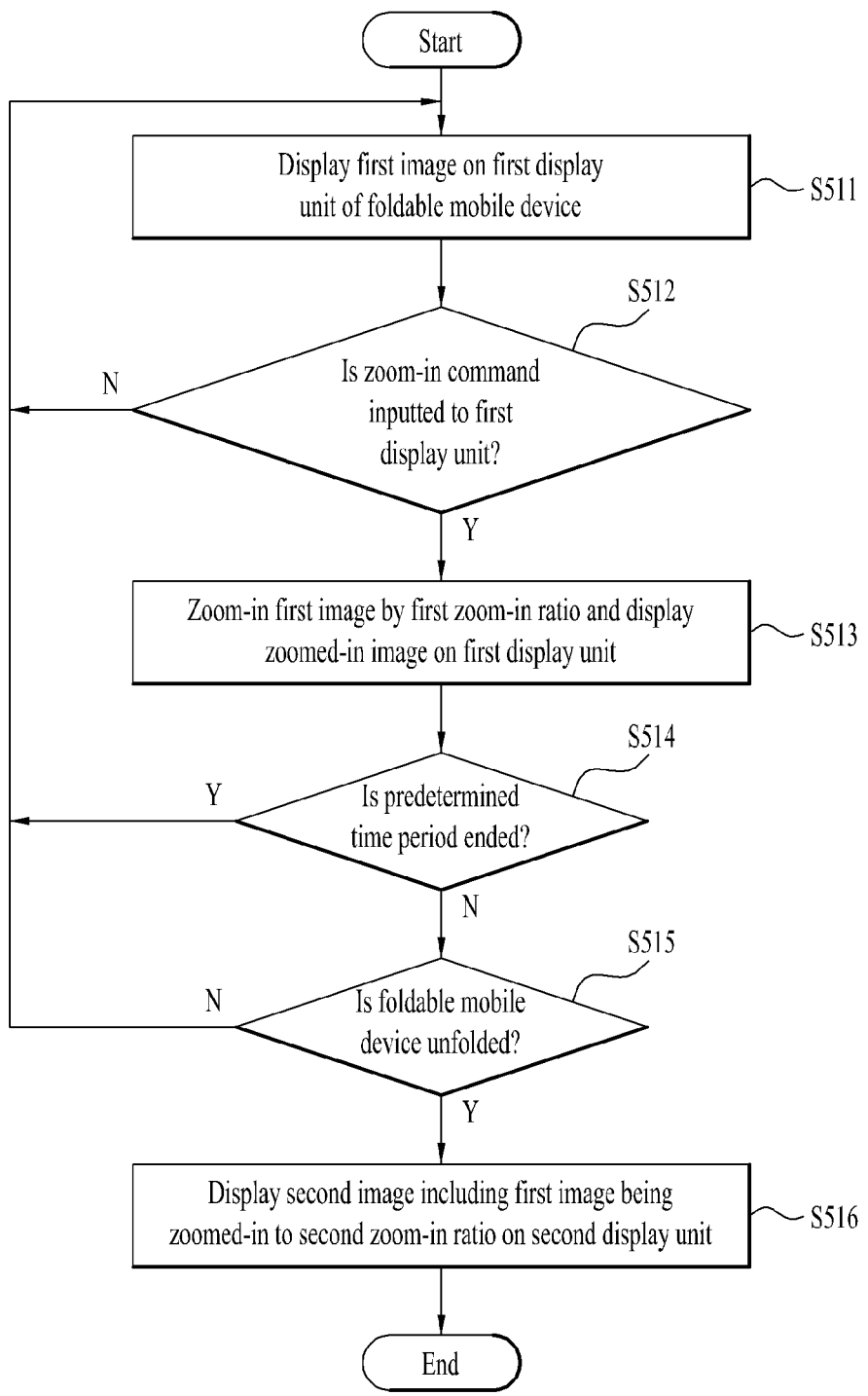
Figure 18:
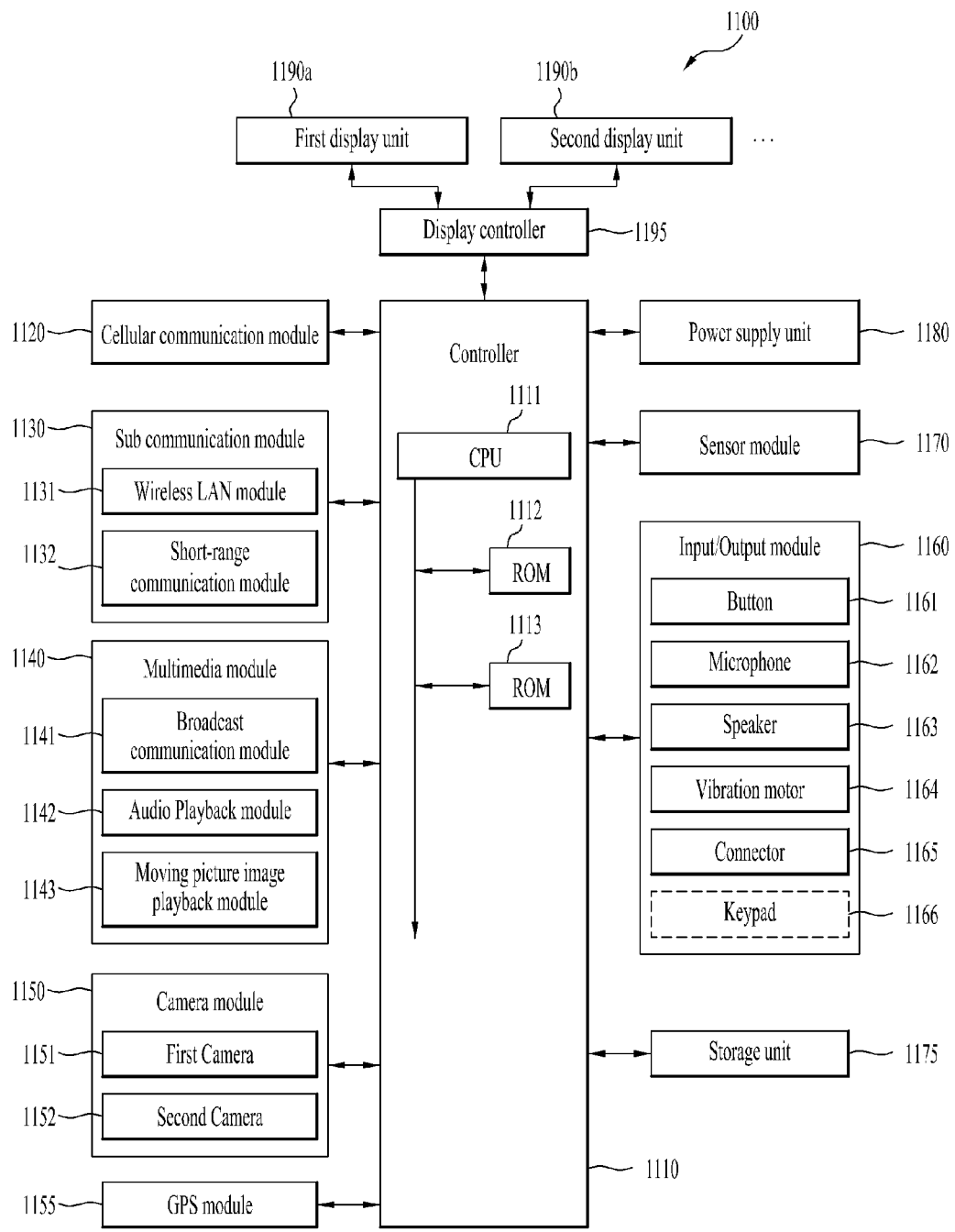

(a) to (c) of FIG. 2 illustrate an exemplary image being displayed on a first display unit and a second display unit of the foldable mobile device of FIG. 1 according to the exemplary embodiment of the present specification;

(a) to (c) of FIG. 3 illustrate a perspective view of a foldable mobile device according to another exemplary embodiment of the present specification;

(a) to (c) of FIG. 4 illustrate a perspective view of a foldable mobile device according to yet another exemplary embodiment of the present specification;

(a) and (b) of FIG. 5 illustrate an exemplary image being displayed on a first display unit and a second unit, when a zoom-in operation is not being performed, according to an exemplary embodiment of the present specification;

(a) and (b) of FIG. 6 illustrate an exemplary image being displayed on a first display unit and a second unit, when a zoom-in operation is not being performed, according to another exemplary embodiment of the present specification;

(a) to (c) of FIG. 7 illustrate an exemplary image being displayed on a first display unit and a second unit, when a zoom-in operation is being performed, according to an exemplary embodiment of the present specification;

(a) to (d) of FIG. 8 illustrate an exemplary image being displayed on a first display unit and a second unit, when a zoom-in operation is being performed, according to another exemplary embodiment of the present specification;

(a) and (b) of FIG. 9 illustrate an exemplary image being displayed on a first display unit and a second unit, when a zoom-in operation is not being performed, according to yet another exemplary embodiment of the present specification;

(a) to (c) of FIG. 10 illustrate an exemplary image being displayed on a first display unit and a second unit, when a zoom-in operation is being performed, according to yet another exemplary embodiment of the present specification;

(a) to (c) of FIG. 11 illustrate an exemplary image being displayed on a first display unit and a second unit, when a zoom-in operation is not being performed, according to yet another exemplary embodiment of the present specification;

(a) and (b) of FIG. 12 and FIG. 13 respectively illustrate an exemplary image being displayed on a first display unit and a second unit, when a zoom-in operation is not being performed, according to yet another exemplary embodiment of the present specification;

(a) to (d) of FIG. 14 illustrate an exemplary image being displayed on a first display unit and a second unit, when a zoom-in operation is being performed, according to yet another exemplary embodiment of the present specification;

(a) to (c) of FIG. 15 illustrate an exemplary image being displayed on a first display unit and a second unit, when a zoom-in operation is not being performed, according to yet another exemplary embodiment of the present specification;

(a) to (d) of FIG. 16 illustrate an exemplary image being displayed on a first display unit and a second unit, when a zoom-in operation is being performed, according to yet another exemplary embodiment of the present specification;

FIG. 17 illustrates a flow chart showing a method of controlling a display of the foldable mobile device according to an exemplary embodiment of the present specification; and FIG. 18 illustrates a block view showing the structure of the foldable mobile device according to an exemplary embodiment of the present specification.

DESCRIPTION OF THE PREFERRED EMBODIMENTS

Hereinafter, preferred exemplary embodiments of the present specification that can best carry out the above-described objects of the preset specification will be described in detail with reference to the accompanying drawings. At this point, the structure or configuration and operations of the present specification, which are illustrated in the drawings and described with respect to the drawings, will be provided in accordance with at least one exemplary embodiment of the present specification. And, it will be apparent that the technical scope and spirit of the present specification and the essential structure and operations of the present specification will not be limited only to the exemplary embodiments set forth herein.

In addition, although the terms used in the present specification are selected from generally known and used terms, the terms used herein may be varied or modified in accordance with the intentions or practice of anyone skilled in the art, or along with the advent of a new technology. Alternatively, in some particular cases, some of the terms mentioned in the description of the present specification may be selected by the applicant at his or her discretion, the detailed meanings of which are described in relevant parts of the description herein. Furthermore, it is required that the present specification is understood, not simply by the actual terms used but by the meaning of each term lying within.

Specific structural and functional description of the present specification respective to the exemplary embodiments, which are provided in accordance with the concept of the present specification disclosed in the description of the present specification, is merely an exemplary description provided for the purpose of describing the exemplary embodiments according to the concept of the present specification. And, therefore, the exemplary embodiment of the present specification may be realized in diverse forms and structures, and, it should be understood that the present specification is not to be interpreted as being limited only to the exemplary embodiments of the present specification, which are described herein.

Since diverse variations and modifications may be applied to the exemplary embodiments according to the concept of the present specification, and, since the exemplary embodiments of the present specification may be configured in diverse forms, specific embodiment of the present specification will hereinafter be described in detail with reference to the examples presented in the accompanying drawings. However, it should be understood that the exemplary embodiments respective to the concept of the present specification will not be limited only to the specific structures disclosed herein. And, therefore, it should be understood that all variations and modifications, equivalents, and replacements, which are included in the technical scope and spirit of the present specification, are included.

Additionally, in the description of the present specification, although terms such as first and/or second may be used to describe diverse elements of the present specification, it should be understood that the elements included in the present specification will not be limited only to the terms used herein. The above-mentioned terms will only be used for the purpose of differentiating one element from another element, for example, without deviating from the scope of the present specification, a first element may be referred to as a second element, and, similarly, a second element may also be referred to as a first element.

Moreover, throughout the entire description of the present specification, when one part is said to "include (or comprise)" an element, unless specifically mentioned otherwise, instead of excluding any other element, this may signify that the one part may further include other elements. Furthermore, the term "unit (or part)", which is mentioned in the description of the present specification, refers to a unit for processing at least one function or operation, and this may be realized in the form of hardware, software, or in a combination of both hardware and software.

The description of the present specification relates to controlling an image that is being displayed on a display unit, when the foldable mobile device is unfolded.

Most particularly, the description of the present specification relates to effectively displaying an image, which is zoomed-in or zoomed-out, when using the zooming function in the foldable mobile device.

In the description of the present specification, the foldable mobile device refers to a mobile device (or user equipment) that can be folded at least once with respect to at least one folding axis. The foldable mobile device according to the present specification may include a flexible mobile device. According to an exemplary embodiment of the present specification, the flexible mobile device may be folded or bended with respect to a folding axis of the mobile device.

The foldable mobile device according to the present specification includes a first display unit displaying a first image and a second display unit displaying a second image.

The first display unit corresponds to a panel in which the first image is displayed, when the foldable mobile device is folded, and the second display unit corresponds to a panel in which the second image is displayed, when the foldable mobile device is unfolded. The second display unit includes one or more folding areas in accordance with a number of folding times, a folding method, and so on. Moreover, according to the exemplary embodiment of the present specification, a display screen of the first display unit is smaller than a display screen of the second display unit.

(a) to (c) of FIG. 1 illustrate a perspective view of a foldable mobile device according to an exemplary embodiment of the present specification. Most particularly, FIG. 1 shows an example of the foldable mobile device being folded inward once with respect to a central axis and then unfolded.

In FIG. 1, the foldable mobile device includes a first display unit 110 displaying a first image and a second display unit 120 displaying a second image.

The first display unit 110 corresponds to a panel through which a first image is displayed when the foldable mobile device is folded, as shown in (a) of FIG. 1, and the first display unit 110 includes a touchscreen. According to an exemplary embodiment of the present specification the touchscreen included in the first display unit 110 operates as a main screen. Additionally, according to the exemplary embodiment of the present specification, when the foldable mobile device is folded, the first display unit 110 is used as a mobile phone.

The second display unit 120 corresponds to a panel through which a second image is displayed when the foldable mobile device is unfolded, as shown in (b) and (c) of FIG. 1, and, in this case, the second display unit 120 includes a first folding area 130 and a second folding area 140. Each of the first folding area 130 and the second folding area 140 includes a touchscreen.

(b) of FIG. 1 corresponds to an example of the foldable mobile device being partially unfolded, and (c) of FIG. 1 corresponds to an example of the foldable mobile device being fully unfolded.

According to the exemplary embodiment of the present specification, in the second display unit 120, the first folding area 130 and the second folding area 140 are connected to one another by a hinge.

According to the exemplary embodiment of the present specification, although it is shown that the first folding area 130 and the second folding area 140 of FIG. 1 have the same size, the size of the first folding area 130 and the second folding area 140 may be different from one another depending upon the folding position.

Moreover, although FIG. 1 shows an example of the foldable mobile device being folded inward, the foldable mobile device may also be folded outward. In this case, also, the folding position may correspond to a central axis of the second display unit, or the folding position may correspond to another position.

(a) of FIG. 2 shows an example of a first image being displayed on the first display unit 110 of the foldable mobile device according to the present specification. In the specification of the present specification, the first image may correspond to an icon or may correspond to an image that is executed with respect to a touch applied on a specific icon. For example, an image being executed and displayed in accordance with a touch motion applied on a specific icon may correspond to a picture (or photo), a drawing, a map, a webpage, a document, and so on.

Although (a) of FIG. 2 does not illustrate the display of a background image, a pre-set (or predetermined) background image may be manually or automatically displayed by the user or by the system.

(a) of FIG. 2 shows an example of one or more icons being displayed on the touchscreen of the first display unit 110. The displayed icons correspond to execution icons. More specifically, when one of the corresponding icons is touched, a program (or application) respective to the touched icon is executed. For example, when it is assumed that an icon having a pathfinder function is being displayed, and when the corresponding icon is touched, a pathfinder application is executed, thereby displaying an image required for pathfinding on the first display unit 110.

Most particularly, according to the exemplary embodiment of the present specification, the icons being displayed on the first display unit 110 correspond to icons, which are created (or generated) by using a "Shortcut" function. In this case, the touchscreen of the first display unit 110 becomes a Home screen. Additionally, the touchscreen of the first display unit 110 includes at least one or more pages in accordance with a number of icons, a positioning (or alignment) of the icons, and so on. At least one icon may be positioned or may not be positioned in each page.

Additionally, the first display unit 110 shown in (a) of FIG. 2 may be used as a mobile phone. For this, at least one or more fixed icons may be displayed on a lower portion 211 of the touchscreen. For example, the fixed icons may respectively correspond to a Dial icon for making a phone call, a Message icon, a Menu icon, and so on. Moreover, at least one or more menu buttons may also be positioned on a lower portion 212 of a bezel of the first display unit 110. At this point, according to the exemplary embodiment of the present specification, the menu buttons may correspond to push buttons and/or touch buttons. The menu buttons may perform diverse functions, such as 'Move to Home Screen', 'Return to Previous Page (or State)', 'Search', and so on. An upper portion of the bezel may be equipped with a camera and may also be equipped with a microphone and/or a speaker. Furthermore, the first display unit 110 may further include a status bar at an upper portion of the touchscreen, Herein the status bar indicates antenna status, current time, battery status, and so on.

(b) of FIG. 2 shows an example of a second image being displayed on the second display unit 120 in the foldable mobile device according to the present specification. In the specification of the present specification, the second image may correspond to an icon or may correspond to an image that is executed with respect to a touch applied on a specific icon, and the second image may be in connection with the first image, which is displayed on the first display unit 110. Herein, an image that is in connection with the first image may correspond to an image that is identical to the first image, or may correspond to a portion of the first image, or may correspond to a merged (or combined) image consisting of the first image and a third image that is not displayed as the first image. For example, when a first image, such as a map, a photo, and so on, is being displayed on the first display unit 110 of the foldable mobile device, and when the foldable mobile device is unfolded, the image that is in connection with the first image may be displayed on the second display unit 120.

Although (b) of FIG. 2 does not illustrate the display of a background image, a pre-set (or predetermined) background image may be manually or automatically displayed by the user or by the system.

(b) of FIG. 2 shows an example of at least one or more icons being displayed on the touchscreen of the first folding area 130 and on the touchscreen of the second folding area 140 of the second display unit 120. At this point, the icons may be displayed on only one of the first folding area 130 and the second folding area 140.

The displayed icons correspond to execution icons. More specifically, when one of the corresponding icons is touched, a program (or application) respective to the touched icon is executed. For example, when it is assumed that an icon having a pathfinder function is being displayed, and when the corresponding icon is touched, a pathfinder application is executed, thereby displaying an image required for pathfinding on at least one of the first folding area 130 and the second folding area 140 of the second display unit 120.

For example, according to the exemplary embodiment of the present specification the icons being displayed on the second display unit 120 respectively correspond to icons of all programs/applications being stored in the foldable mobile device. In this case, the touchscreens of the first and second folding areas 130 and 140 of the second display unit 120 become the menu screens. Similarly, each of the touchscreens of the first and second folding areas 130 and 140 of the second display unit 120 includes at least one or more pages in accordance with a number of icons, a positioning (or alignment) of the icons, and so on. At least one icon may be positioned or may not be positioned in each page. If the first display unit 110 operates as the Home screen, and if the second display unit 120 operates as the Menu screen, at least one or more of the icons being displayed on the second display unit 120 may be displayed on the first display unit 110 in accordance with user selection or system selection.

According to another exemplary embodiment of the present specification, at least one of the first folding area 130 and the second folding area 140 of the second display unit 120 may be operated as the Home screen. In this case, the Home screen of the first display unit 120 may be displayed, or at least one of the remaining pages of the Home screen may be displayed.

Moreover, at least one or more menu buttons may also be positioned on a lower portion of each bezel of the first folding area 130 and the second folding area 140 of the second display unit 120 shown in (b) of FIG. 2. At this point, according to the exemplary embodiment of the present specification, the menu buttons may correspond to push buttons and/or touch buttons. Additionally, the menu buttons positioned in the first folding area 130 and the menu buttons positioned in the second folding area 140 may perform the same functions or may perform different functions. FIG. 2 illustrates an example wherein the menu buttons positioned on the lower portion of the bezel of the first display unit 110 perform the same functions as the menu buttons positioned on the lower portion of each bezel of the first and second folding areas of the second display unit 120.

Furthermore, a status bar 216 indicating antenna status, current time, battery status, and so on, may be displayed on an upper portion of at least one of the touchscreen of the first folding area 130 and the touchscreen of the second folding area 140 of the second display unit 120.

(b) of FIG. 2 shows an exemplary display of a second image, when the foldable mobile device is unfolded without having the user perform any operation on the first display unit 110 shown in (a) of FIG. 2.

Additionally, according to the exemplary embodiment of the present specification, when a Menu icon of the first display unit 110 shown in (a) of FIG. 2 is touched by the user, while the foldable mobile device is in a folded state, icons, as shown in (a) of FIG. 2, are displayed on the touchscreen of the first display unit 110.

Thereafter, when the foldable mobile device is unfolded after a program/application corresponding to the specific icon is executed in the first display unit 110 shown in (a) of FIG. 2, and after the first image corresponding to the executed program/application is displayed, icons may be displayed on the second display unit 120 as the second image, or an image being in connection with the first image may be displayed as the second image. Herein, an image that is in connection with the first image may correspond to an image that is identical to the first image, or may correspond to a portion of the first image, or may correspond to a merged (or combined) image consisting of the first image and a third image that is not displayed as the first image. Whether the icons are to be displayed on the second display unit 120 as the second image, or whether an image being in connection with the first image is to be displayed on the second display unit 120 as the second image may be differently determined based upon diverse factors, such as whether or not a zoom-in/zoom-out function is executed in the first display unit 110, the user's selection, and so on.

According to the exemplary embodiment of the present specification, when an execution image of a specific icon is displayed on the first display unit 110, and when the foldable mobile device is unfolded without performing any zoom-in/zoom-out operations, a second image of a predetermined display mode is displayed on the second display unit 120. Herein, the second image of the predetermined display mode may correspond to icons or may correspond to the image being in connection with the first image. And, herein, one of the two is determined within the system as a default value, and the user may use the Menu screen or button, so as to change the settings.

According to another exemplary embodiment of the present specification, when an execution image of a specific icon is displayed on the first display unit 110, and when the foldable mobile device is unfolded after a zoom-in operation is performed, an image being in connection with the first image is displayed on the second display unit 120 as the second image. Herein, the second image corresponds to an image having the same zoom-in ratio as the first image or corresponds to an image having a zoom-in ratio greater than that of the first image.

(a) to (c) of FIG. 3 illustrate a perspective view of a foldable mobile device according to another exemplary embodiment of the present specification. And, most particularly, FIG. 3 shows an example wherein the foldable mobile device is folded inward with respect to ⅓ positions on both left and right sides of the foldable mobile device, and wherein the foldable mobile device is unfolded afterwards.

Referring to FIG. 3, the foldable mobile device may also include a first display unit 310 displaying a first image and a second display unit 320 displaying a second image.

The first display unit 310 corresponds to a panel having the first image displayed thereon, when the foldable mobile device is folded, as shown in (a) of FIG. 3, and the first display unit 310 includes a touchscreen. According to the exemplary embodiment of the present specification, the touchscreen being included in the first display unit 310 is operated as a main screen.

The second display unit 320 corresponds to a panel having the second image displayed thereon, when the foldable mobile device is unfolded, as shown in (b) and (c) of FIG. 3, and, in this case, the second display unit 320 includes a first folding area 330, a second folding area 340, and a third folding area 350. Herein, each of the first to third folding areas 330 to 350 includes a touchscreen.

(b) of FIG. 3 corresponds to an example of the foldable mobile device being partially unfolded, and (c) of FIG. 3 corresponds to an example of the foldable mobile device being fully unfolded.

According to the exemplary embodiment of the present specification, in the second display unit 320, the first to third folding areas 330 to 350 are connected to one another by a hinge.

According to the exemplary embodiment of the present specification, although it is shown that each of the first to third folding areas 330 to 350 of FIG. 3 has the same size, the sizes of the first folding area 330, the second folding area 340, and the third folding area 350 may be different from one another depending upon the folding position. For example, the size of each of the first to third folding areas 330 to 350 may be different from one another, or the size of only two folding areas may be identical to one another. More specifically, the first folding position 370 and the second folding position 380 of the foldable mobile device may be determined as ⅓ portions of each of the left side and right side of the second display unit 320, and, depending upon intentions of the system designer, at least one of the left and right portions may be smaller or larger than ⅓ of the second display unit 320.

Moreover, although FIG. 3 shows an example of the foldable mobile device being folded inward with respect to the first folding position 370 and the second folding position 380, the foldable mobile device may also be folded outward with respect to the first folding position 370 and the second folding position 380. In this case, the touchscreen of the second folding area, which is located in the middle of the second display unit, may be used as the main screen. Alternatively, the touchscreen of any one of first folding area and the second folding area of the second display unit may be used as the main screen. In another example, may be folded inward with respect to any one of the first folding position 370 and the second folding position 380 and may be folded outward with respect to the other folding position. In this case, depending upon the first and second folding positions, and the folding direction with respect to the first folding position and the second folding position, the touchscreen of any one of the first folding area and the second folding area of the second display unit may be used as the main screen.

(a) to (c) of FIG. 4 illustrate a perspective view of a foldable mobile device according to yet another exemplary embodiment of the present specification. And, most particularly, FIG. 4 shows an example wherein the foldable mobile device is folded outward with respect to ¼ positions on both left and right sides of the foldable mobile device, and wherein the foldable mobile device is unfolded afterwards.

Referring to FIG. 4, the foldable mobile device may also include a first display unit 410 displaying a first image and a second display unit 420 displaying a second image.

The first display unit 410 corresponds to a panel having the first image displayed thereon, when the foldable mobile device is folded, as shown in (a) of FIG. 4, and the first display unit 410 includes a touchscreen. According to the exemplary embodiment of the present specification, the touchscreen being included in the first display unit 410 is operated as a main screen.

(b) of FIG. 4 shows a rear view of (a) of FIG. 4. More specifically, if the foldable mobile device shown in (a) of FIG.

4 is flipped over, the foldable mobile device is folded to have the form shown in (b) of FIG. 4.

The second display unit 420 corresponds to a panel having the second image displayed thereon, as shown in (c) of FIG. 4, when the foldable mobile device is unfolded from the folded state shown in (b) of FIG. 4, and the second display unit 420 includes a first folding area 430, a second folding area 440, and a third folding area 450. Herein, each of the first to third folding areas 430 to 450 includes a touchscreen. In (c) of FIG. 4, the third folding area 450 is not shown (or visible) because the corresponding area is a folded part.

According to the exemplary embodiment of the present specification, in the second display unit 420, the first to third folding areas 430 to 450 are connected to one another by a hinge.

In the second display unit 420 of FIG. 4, each of the first folding area 430 and the third folding area 450 corresponds to ½ the size of the second folding area 440. More specifically, the combined size of the first folding area 430 and the third folding area 450 is equal to the size of the second folding area 440.

Additionally, although FIG. 4 shows an example of the foldable mobile device being folded outward with respect to a first folding position and a second folding position, the foldable mobile device may conversely be folded inward with respect to the first folding position and the second folding position. In this case, the touchscreen of the second folding area 440, which is located in the middle of the second display unit, may be used as the main screen.

In the foldable mobile device shown in FIG. 3 or FIG. 4, the first image may correspond to an icon or may correspond to an image that is executed with respect to a touch applied on a specific icon. For example, an image being executed and displayed in accordance with a touch motion applied on a specific icon may correspond to a picture (or photo), a drawing, a map, a webpage, a document, and so on.

In the first display unit 310 and 410 and/or the second display unit 320 and 420, although the drawing does not illustrate the display of a background image, a pre-set (or predetermined) background image may be manually or automatically displayed by the user or by the system.

Additionally, in the foldable mobile device shown in FIG. 3 or FIG. 4, the second image being displayed on the second display unit 320 and 420 may correspond to an icon or may correspond to an image that is executed with respect to a touch applied on a specific icon, and the second image may be in connection with the first image, which is displayed on the first display unit 310 and 410. Herein, an image that is in connection with the first image may correspond to an image that is identical to the first image, or may correspond to a portion of the first image, or may correspond to a merged (or combined) image consisting of the first image and a third image that is not displayed as the first image.

If the first image being displayed on the first display unit 310 and 410 corresponds to one or more icons, and if the second image being displayed on the second display unit 320 and 420 corresponds to one or more icons, the touchscreen of the first display unit 310 and 410 may be used as the Home screen, and the touchscreen of the second display unit 320 and 420 may be used as the remaining pages of the Home screen or may be used as a Menu screen. In another example, any one of the first to third folding areas of the second display unit 320 and 420 may be operated as the Home screen, and the remaining two folding areas may each be operated as the Menu screen.

Additionally, the touchscreen of the first display unit 310 and 410 includes at least one or more pages in accordance with a number of icons, a positioning (or alignment) of the icons, and so on. And, the touchscreen of the second display unit 320 and 420 includes at least one or more pages in accordance with a number of icons, a positioning (or alignment) of the icons, and so on.

Moreover, at least one or more fixed icons may be displayed on a lower portion of the touchscreen of the first display unit 310 and 410, and at least one or more menu buttons may also be displayed on a lower portion of the bezel of the first display unit 310 and 410. At this point, according to the exemplary embodiment of the present specification, the menu buttons may correspond to push buttons and/or touch buttons. The menu buttons may perform diverse functions, such as 'Move to Home Screen', 'Return to Previous Page (or State)', 'Search', and so on. An upper portion of the bezel may be equipped with a camera and may also be equipped with a microphone and/or a speaker. Furthermore, the first display unit 310 and 410 may further include a status bar at an upper portion of the touchscreen, wherein the status bar indicates antenna status, current time, battery status, and so on. Additionally, at least one or more menu buttons may also be positioned at the lower portion of the bezel of each of the first to third folding positions of the second display unit 320 and 420. At this point, according to the exemplary embodiment of the present specification, the menu buttons may correspond to push buttons and/or touch buttons. FIG. 3 and FIG. 4 show examples of the menu buttons positioned at the lower portion of the bezel of the first display unit 310 and 410 having the same functions as the menu buttons positioned at the lower portion of the bezel of each of the first to third folding positions of the second display unit 320 and 420.

Furthermore, a status bar indicating antenna status, current time, battery status, and so on, may be displayed on an upper portion of any one of the touchscreens of the first to third folding areas of the second display unit 320 and 420.

When the foldable mobile device is unfolded without having the user perform any operation, while the foldable mobile device is in a state of having icons displayed on the first display unit 310 and 410 of FIG. 3 and FIG. 4, at least one or more icons may also be displayed on at least one of the screens of the first to third folding areas of the second display unit 320 and 420.

Additionally, according to the exemplary embodiment of the present specification, while the foldable mobile device is in a folded state, and when a menu icon of the first display unit 310 and 410 is touched by the user, menu icons are displayed on the touchscreen of the first display unit 310 and 410.

Thereafter, when the user unfolds the foldable mobile device after a program/application corresponding to the specific icon is executed in the first display unit 310 and 410, and after the first image corresponding to the executed program/application is displayed, icons may be displayed on the second display unit 320 and 420 as the second image, or an image being in connection with the first image may be displayed as the second image. Herein, an image that is in connection with the first image may correspond to an image that is identical to the first image, or may correspond to a portion of the first image, or may correspond to a merged (or combined) image consisting of the first image and a third image that is not displayed as the first image. Whether the icons are to be displayed on the second display unit 320 and 420 as the second image, or whether an image being in connection with the first image is to be displayed on the second display unit 320 and 420 as the second image may be differently determined based upon diverse factors, such as whether or not a zoom-in/zoom-out function is executed in the first display unit 310 and 410, the user's selection, and so on.

According to the exemplary embodiment of the present specification, when an execution image of a specific icon is displayed on the first display unit 310 and 410, and when the user unfolds the foldable mobile device without performing any zoom-in/zoom-out operations, a second image of a predetermined display mode is displayed on the second display unit 320 and 420. Herein, the second image of the predetermined display mode may correspond to icons or may correspond to the image being in connection with the first image. And, herein, one of the two is determined within the system as a default value, and the user may use the Menu screen or button, so as to change the settings.

According to another exemplary embodiment of the present specification, when an execution image of a specific icon is displayed on the first display unit 310 and 410, and when the user unfolds the foldable mobile device after a zoom-in operation is performed, an image being in connection with the first image is displayed on the second display unit 320 and 420 as the second image. Herein, the second image corresponds to an image having the same zoom-in ratio as the first image or corresponds to an image having a zoom-in ratio greater than that of the first image.

(a) and (b) of FIG. 5 respectively show examples of an image, which is in connection with a first image, being displayed on a second display unit 120 as a second image, when a foldable mobile device is unfolded without any zoom-in operations after an execution image of a specific icon is displayed on a first display unit 110 of the foldable mobile device shown in FIG. 1. More specifically, (a) and (b) of FIG. 5 respectively show exemplary embodiments of the present specification of a case when the second image of a predetermined display mode corresponds to an image being in connection with the first image.

Most particularly, (a) of FIG. 5 shows an example of a first image being displayed on the touchscreen of the first display unit 110, when a location tracking application for searching my current position (or the current position of the user) or someone else's current position (or the current position of another user) is being executed from the first display unit 110 of the foldable mobile device shown in FIG. 1. For example, when my current position as been requested, the Current Position (or 'You are here') being indicated on the map becomes my current position (or the current position of the current user). In another example, when someone else's current position has been requested, the Current Position (or 'You are here') being indicated on the map becomes the current position of the particular person requested by me (i.e., the current user). Additionally, the Current Position (or 'You are here') marked (or indicated) on the map may be used (or considered) as an important point having a significance given by the current user. (b) of FIG. 5 shows an example of an image being in connection with the first image being displayed on a combined (or merged) touchscreen of the first and second folding areas 130 and 140 of the second display unit 120 as the second image, when the user unfolds the foldable mobile device without performing any zoom-in operations, while the foldable mobile device is in a state of having the current position of an individual (or person) designated by the user being indicated (or marked) on a map, which is displayed on the touchscreen of the first display unit 110 of the foldable mobile device, as shown in (a) of FIG. 1.

For example, the second image of (b) of FIG. 5 includes a first image, which is displayed on the first display unit 110 of (a) of FIG. 5, and a third image, which is not displayed on the first display unit 110. This is because the size of the touchscreen of the first display unit 110 is smaller than the size of a combined (or merged) touchscreen consisting of the touchscreens of the first and second folding areas 130 and 140 of the second display unit 120 put together. At this point, according to the exemplary embodiment of the present specification, an object of the second image being displayed on the second display unit 120 is larger or identical to an object of the first image being displayed on the first display unit 110. At this point, according to the exemplary embodiment of the present specification, since the current position corresponds to an important point designated by the user, when the foldable mobile device is unfolded, the current position must be displayed on the second display unit 120.

Meanwhile, according to the exemplary embodiment of the present specification, although it is not displayed on the first display unit 110, when Point of Interest (POI) information, which is predetermined by the user, exists in the surroundings of the current position, which is marked on the map, a third image including the POI information is displayed on the second display unit 120. According to the exemplary embodiment of the present specification, the POI information is displayed as an icon, which easily indicates the type of the point of interest (POI). Although the POI information may be designated by the user, the map producer (or provider) may also designate public facilities or hospitals, and so on, as the POI information. In the description of the present specification, examples of the user designating the POI information will be described, and POI information designated by the map producer (or provider) may also be displayed herein.

In (b) of FIG. 5, two different types of POI information 151 and 152 are displayed on the second folding area 140 of the second display unit 120. (b) of FIG. 5 shows an example of the two different types of POI information 151 and 152 being located on the right side of the current position. If at least one type of POI information is located on the left side of the current position, the section displaying the current position may be shifted rightward and displayed in the second display unit 120 as compared to the displayed location shown in (b) of FIG. 5.

If there is no POI information designated by the user in the surroundings of the current position, the same image as that of (a) of FIG. 5 is displayed on the touchscreen of the first folding area 130 of the second display unit 120, and a third image, which was not displayed on the first display unit 110 shown in (a) of FIG. 5, may be displayed on the touchscreen of the second folding area 140.

In another example, a first image is displayed at the center (or in the middle) of the combined touchscreen of the first and second folding areas 130 and 140 of the second display unit 120, and a third image may be displayed on the surroundings of the displayed first image. If a horizontal/vertical ratio of the first image is predecided, the first image may be displayed only on a partial section (e.g., center) of the display screen of the second display unit 120 as the second image. (a) and (b) of FIG. 6 respectively show examples of icons of a Home screen or Menu screen being displayed on a second display unit 120 as a second image, when a foldable mobile device is unfolded without any zoom-in operations after an execution image of a specific icon is displayed on a first display unit 110 of the foldable mobile device shown in FIG. 1. More specifically, (a) and (b) of FIG. 6 respectively show exemplary embodiments of the present specification of a case when the second image of a predetermined display mode corresponds to an icon image being in connection with the first image.

Since the content being displayed on the first display unit 110 of (a) of FIG. 6 is identical to that of (a) of FIG. 5, detailed description of the same will be omitted for simplicity.

(b) of FIG. 6 shows an example of icons of the Menu screen being displayed on each touchscreen of the first and second folding areas 130 and 140 of the second display unit 120 as the second image, when the user unfolds the foldable mobile device without performing any zoom-in operations, while the foldable mobile device is in a state of having the current position of an individual (or person) designated by the user being indicated (or marked) on a map, which is displayed on the touchscreen of the first display unit 110 of the foldable mobile device, as shown in (a) of FIG. 1.

In another example, icons of the same Home screen as the first display unit 110 are displayed on the touchscreen of the first folding area 130 of the second display unit 120, and icons of another page of the Home screen are displayed on the second folding area 140 of the second display unit 120. In yet another example, icons of the same Home screen as the first display unit 110 may be displayed on the touchscreen of the first folding area 130 of the second display unit 120, and icons of the Menu screen may be displayed on the second folding area 140 of the second display unit 120. In yet another example, icons of remaining pages of the Home screen, which is displayed on the first display unit 110, may be displayed on at least one of the first folding area 130 and the second folding area 140 of the second display unit 120.

(a) to (c) of FIG. 7 respectively show examples of a first image and a second image, when the first image is zoomed-in in the first display unit 110, and when the foldable mobile device is unfolded afterwards.

More specifically, (a) of FIG. 7 shows an example of a first image being displayed on the touchscreen of the first display unit 110, when a location tracking application for searching my current position (or the current position of the user) or someone else's current position (or the current position of another user) is being executed from the first display unit 110 of the foldable mobile device shown in FIG. 1.

When a zoom-in command is inputted in order to enlarge the first image of the first display unit 110 shown in (a) of FIG. 7, the image that is zoomed-in (or enlarged) in accordance with the zooming ratio is displayed on the first display unit 110 as shown in (b) of FIG. 7. At this point, as the first image is enlarged in accordance with the zoom-in ratio and displayed on the first display unit 110, a portion of the first image disappears from the touchscreen of the first display unit 110. This is because the objects included in the first image are also enlarged in accordance with the zoom-in ratio. At this point, the image (or portion of the image), which has disappeared from the first display unit 110 due to the zoom-in operation, may correspond to an image of the important point, to which the user has given significance prior to the zoom-in operation. For example, due to the zoom-in operation, a section of the image indicating the Current Position may not be displayed on the first display unit 110. This may occur when the zoom-in command is inputted from a specific section (or location) that is spaced apart from the section indicating the Current Position at a predetermined distance.

Herein, a zoom-in/zoom-out command may be inputted by the user by directly or indirectly touching the touchscreen using at least one finger, or by directly or indirectly touching the touchscreen using a touch pen, or by using a Menu, and so on. In another example, the zoom-in/zoom-out command may be inputted by the user using a keypad, a dome switch, a jog wheel, a jog switch, and so on, which are provided on the foldable mobile device. In yet another example, a scroll bar for inputting a zoom-in/zoom-out command may be displayed on a predetermined section of the touchscreen having the image displayed thereon. Thereafter, the zoom-in/zoom-out command may be inputted by manipulating (or operating) the scroll bar. According to the exemplary embodiment of the present specification, in the description of the present specification, if the user spreads out two fingers (i.e., drags outward) at a specific section of the touchscreen he (or she) wishes to enlarge, this gesture is recognized as a zoom-in command, and if the user gathers the two fingers inward (i.e., drags inward), this gesture is recognized as a zoom-out command. Hereinafter, in the description of the present specification, the zoom-in/zoom-out command will also be referred to as a zoom-in/zoom-out gesture for simplicity.

Additionally, when the image that is zoomed-in (or enlarged) in accordance with the zoom-in ratio, is displayed on the first display unit 110 as shown in (b) of FIG. 7, the zoom-in ratio may be set up in advance or may be decided in accordance with the spreading range of the user's two fingers. Similarly, the zoom-out ratio may also be set up in advance or may be decided in accordance with the gathering range of the user's two fingers.

When the user unfolds the foldable mobile device, while the foldable mobile device is in a state of having the first image zoomed-in by a zoom-in ratio and displayed on the first display unit 110 of the foldable mobile device, as shown in (b) of FIG. 7, a second image is displayed on the second display unit 120, as shown in (c) of FIG. 7. At this point, the second image being displayed on the second display unit 120 may correspond to the image being zoomed-in by the respective zoom-in ratio in the first display unit 110, or the second image may correspond to a zoomed-in image of the first image (i.e., the original first image) shown in (a) of FIG. 7 by the respective zoom-in ratio, when the foldable mobile device is unfolded.

In the description of the present specification, the zoom-in ratio of the image being zoomed-in and displayed on the first display unit 110 will hereinafter be referred to as a first zoom-in ratio, and the zoom-in ratio of the image being zoomed-in and displayed on the second display unit 120 will hereinafter be referred to as a second zoom-in ratio.

Hereinafter, according to the exemplary embodiment of the present specification, in the description of the present specification, when the user unfolds the foldable mobile device, while the foldable mobile device is in a state of having the first image zoomed-in by the first zoom-in ratio and displayed on the first display unit 110, the image shown in (a) of FIG. 7 (i.e., the image prior to being zoomed-in by the first zoom-in ratio) is zoomed-in by the second zoom-in ratio and displayed on the second display unit 120. According to another exemplary embodiment of the present specification, if the first zoom-in ratio is identical to the second zoom-in ratio, the first image being zoomed-in by the first zoom-in ratio may be displayed on the second display unit 120. According to yet another exemplary embodiment of the present specification, if the second zoom-in ratio is greater than the first zoom-in ratio, the first image that has been zoomed-in by the first zoom-in ratio may be further zoomed-in by a zoom-in ratio corresponding to a difference between the first zoom-in ratio and the second zoom-in ratio, thereby displaying the newly zoomed-in image on the second display unit 120.

If the first zoom-in ratio is equal to the second zoom-in ratio, the size of the objects of the image being zoomed-in and displayed on the first display unit 110, as shown in (b) of FIG. 7, is the same as the size of the objects of the image being zoomed-in and displayed on the second display unit 120, as shown in (c) of FIG. 7. Conversely, if the first zoom-in ratio is different from the second zoom-in ratio, the size of the objects of the image being zoomed-in and displayed on the first display unit 110, as shown in (b) of FIG. 7, is also different from the size of the objects of the image being zoomed-in and displayed on the second display unit 120, as shown in (c) of FIG. 7.

According to the exemplary embodiment of the present specification, the second image being displayed on the second display unit 120, as shown in (c) of FIG. 7, includes at least a portion of the image being zoomed-in and displayed on the first display unit 110. At this point, since the combined touchscreen of the second display unit 120 is larger than the touchscreen of the first display unit 110, a portion of the first image or the whole first image, which has disappeared from the first display unit 110 due to the zoom-in operation, may be additionally displayed on the second display unit 120. Additionally, the second image may further include a third image, which has not been displayed on the first display unit 110 shown in (a) of FIG. 7.

For example, as shown in (c) of FIG. 7, the zoomed-in image shown in (b) of FIG. 7 is directly displayed on the touchscreen of the first folding area 130 of the second display unit 120 without any modification, and a portion of the first image that has disappeared from the first display unit 110 due to the zoom-in operation and/or a third image that has not been displayed on the first display unit 110 prior to the zoom-in operation may be zoomed-in and then displayed.

In another example, the zoomed-in image shown in (b) of FIG. 7 may be displayed at the center of the combined touchscreen of the first and second folding areas 130 and 140 of the second display unit 120, and the portion of the first image that has disappeared from the first display unit 110 due to the zoom-in operation and/or the third image that has not been displayed on the first display unit 110 prior to the zoom-in operation may be zoomed-in and then displayed on the remaining sections of the combined touchscreen.

According to the exemplary embodiment of the present specification, in the present specification, the second zoom-in ratio is set up (or determined) based upon the first zoom-in ratio. According to the exemplary embodiment of the present specification, the first zoom-in ratio may be set up to be equal to the second zoom-in ratio. According to another exemplary embodiment of the present specification, the second zoom-in ratio may be set up to be greater than the first zoom-in ratio. According to yet another exemplary embodiment of the present specification, an image type, and at least one of a display mode of the first display unit 110 and a display mode of the second display unit 120 may be additionally used for deciding the second zoom-in ratio. At this point, also, the second zoom-in ratio is set up to be equal to or greater than the first zoom-in ratio.

Herein, the image type may be categorized as a picture (or photo), a drawing, a map, a document, a webpage, and so on. The document may correspond to a PowerPoint file. And, the display mode indicates whether each of the first image or the second image is respectively being displayed on the first and second display unit 110 and 120 in a horizontal display mode (or landscape view mode) or a vertical display mode (or a portrait view mode). In the first display unit 110, the vertical display mode (or portrait view mode) corresponds to a state when the first image is being vertically displayed, and the horizontal display mode (or landscape view mode) corresponds to the opposite state (i.e., a state when the first image is being horizontally displayed). In the second display unit 120, the vertical display mode corresponds to a case when the second image is being horizontally displayed, while the first folding area 130 of the second display unit 120 is located on the left side, and while the second folding area 140 of the second display unit 120 is located on the right side. And, in the second display unit 120, the horizontal display mode corresponds to a case when the second image is being vertically displayed, while the first folding area 130 is horizontally located on an upper portion, and while the second folding area 140 is horizontally located on a lower portion.

Thereafter, when the foldable mobile device is unfolded, while the foldable mobile device is in a state of having the first image being displayed in the first display unit 110 in the portrait view mode, the second image is also displayed in the portrait view mode in the second display unit 120. Conversely, when the foldable mobile device is unfolded, while the foldable mobile device is in a state of having the first image being displayed in the first display unit 110 in the landscape view mode, the second image is also displayed in the landscape view mode in the second display unit 120.

For example, when the user unfolds the foldable mobile device, after a drawing or picture having a pre-decided horizontal/vertical ratio is zoomed-in by the first zoom-in ratio and is displayed in the first display unit 110 in the portrait view mode, the drawing or picture that is zoomed-in by the second zoom-in ratio is displayed in the second display mode 120 in the portrait view mode. At this point, the corresponding drawing or picture may be displayed on only a portion (e.g., center) of the touchscreen of the second display unit 120 in accordance with the second zoom-in ratio. If the second zoom-in ratio is set up to be greater than the first zoom-in ratio, a portion of the picture or drawing that is zoomed-in by the first zoom-in ratio disappears from the touchscreen of the second display unit 120. Therefore, it will be preferable that the second zoom-in ratio in this case is set up to be equal to the first zoom-in ratio.

Meanwhile, when a drawing or picture being zoomed-in by a second zoom-in ratio, which is equal to the first zoom-in ratio or greater than the first zoom-in ratio, is rotated by 90 degrees (90°) and is displayed on the touchscreen of the second display mode 120 in the landscape view mode, the picture or drawing that is zoomed-in by the second zoom-in ratio may be displayed on the entire display section (or display area) of the touchscreen of the second display unit 120. Therefore, in this case, it is preferable that the second zoom-in ratio is set up to be equal to or greater than the first zoom-in ratio. Additionally, in this case, a portion of the drawing or picture that is zoomed-in by the first zoom-in ratio does not disappear from the touchscreen of the second display unit 120.

The above-described exemplary embodiment of the present specification described a case when the drawing or picture is displayed on the first display unit 110 in the portrait view mode, and the above-described exemplary embodiment of the present specification is also similarly applied to a case when the picture or drawing is displayed on the first display unit 110 in the landscape view mode. More specifically, when the foldable mobile device is unfolded, it will be more effective to zoom-in the picture or drawing that is displayed on the first display unit 110 in the landscape view mode by a second zoom-in ratio, which is equal to or greater than the first zoom-in ratio, and to rotate the zoomed-in picture or drawing by 90 degrees and to display the rotated picture or drawing on the second display unit 120 in the portrait view mode, than to display the corresponding picture or drawing on the second display unit 120 in the landscape view mode.

At this point, the shifting of the landscape view mode/portrait view mode in the second display unit 120 may be manually set up by the user or may be automatically shifted by the system by using a first zoom-in ratio, a second zoom-in ratio, a display mode of the first display unit 110, an image type, and so on.

Meanwhile, in case of a webpage or a document, just as a picture or drawing, it will be more effective to shift the display mode in the second display mode 120 and to display the corresponding webpage or document, when the foldable mobile device is unfolded. Since the horizontal/vertical ratio of the map is not pre-decided, when a zoomed-in map being displayed on the first display unit 110 in the portrait view mode is displayed on the second display unit 120 in the portrait view mode, the corresponding map is displayed on the entire display section of the touchscreen of the second display unit 120. Similarly, when a zoomed-in map being displayed on the first display unit 110 in the landscape view mode is displayed on the second display unit 120 in the landscape view mode, the corresponding map is displayed on the entire display section of the touchscreen of the second display unit 120. Therefore, in case of a map, it will be preferable to set up the first zoom-in ratio to be equal to the second zoom-in ratio.

As described above, the second zoom-in ratio may be set up to be equal to the first zoom-in ratio, or the second zoom-in ratio may be set up based upon the first zoom-in ratio, an image type, and a display mode of the first and second display units 110 and 120. In this case, the second zoom-in ratio should be greater than the first zoom-in ratio.

(a) to (d) of FIG. 8 respectively show examples of a first image and a second image, when the foldable mobile device is unfolded after the first image, which is displayed on the first display unit 110 of the foldable mobile device in the landscape view mode, is zoomed-in.

Since reference may be made to the description given in FIG. 7 on the method of inputting a zoom-in/zoom-out command and setting up first and second zoom-in ratios, detailed description of the same will be omitted in FIG. 8 for simplicity.

(a) of FIG. 8 shows an example of a first image being displayed on the touchscreen of the first display unit 110 in the landscape view mode (or horizontal display mode), when a location tracking application for searching my current position (or the current position of the user) or someone else's current position (or the current position of another user) is being executed from the first display unit 110 of the foldable mobile device shown in FIG. 1.

When a zoom-in command is inputted to the first display unit 110 of (a) of FIG. 8 in order to enlarge the first image, an image that is zoomed-in (or enlarged) in accordance with the first zoom-in ratio is displayed on the first display unit 110 in the landscape view mode (or horizontal display mode), as shown in (b) of FIG. 8. At this point, as the first image is enlarged in accordance with the first zoom-in ratio and displayed on the first display unit 110, a portion of the first image disappears from the touchscreen of the first display unit 110. This is because the objects included in the first image are also enlarged in accordance with the first zoom-in ratio.

(c) of FIG. 8 shows an example of a second image, which is zoomed-in by a second zoom-in ratio and displayed on the second display unit 120 in the portrait view mode (or vertical display mode), when the user unfolds the foldable mobile device, while the foldable mobile device is in a state of having the image, which is zoomed-in as shown in (b) of FIG. 8, being displayed on the first display unit 110 in the landscape view mode. More specifically, the second image is displayed as a single image on a combined (or merged) touchscreen, which consists of a first folding area 130 located on the left side of the second display unit 120 and a second folding area 140 located on the right side of the second display unit 120.

(d) of FIG. 8 shows an example of a second image, which is zoomed-in by a second zoom-in ratio and displayed on the second display unit 120 in the landscape view mode (or horizontal display mode), when the user unfolds the foldable mobile device, while the foldable mobile device is in a state of having the image, which is zoomed-in as shown in (b) of FIG. 8, being displayed on the first display unit 110 in the landscape view mode. More specifically, the second image is displayed as a single image on a combined (or merged) touchscreen, which consists of a first folding area 130 located on the upper portion of the second display unit 120 and a second folding area 140 located on the lower portion of the second display unit 120.

According to the exemplary embodiment of the present specification, in (c) of FIG. 8 and (d) of FIG. 8, the size of the objects included in the second image are identical to the size of the objects included in the image, which is enlarged in the first display unit 110 in accordance with the first zoom-in ratio. At this point, since the combined touchscreen of the second display unit 120 is larger than the touchscreen of the first display unit 110, a portion of the first image or the entire first image that disappears from the touchscreen of the first display unit 110 due to the zoom-in command may be zoomed-in and displayed on the second display unit 120. Additionally, in accordance with the zoom-in/zoom-out position within the touchscreen, the second display unit 120 may zoom-in a third image, which has not been displayed on the first display unit 110 shown in (a) of FIG. 8, and may additionally display the zoomed-in third image. However, depending upon whether the display mode of the second display unit 120 corresponds to the landscape view mode (or horizontal display mode) or the portrait view mode (or vertical display mode), the contents of the image that has disappeared from the touchscreen of the first display unit 110 due to the zoom-in operation and/or the contents of the third image that has not been displayed on the first display unit 110 shown in (a) of FIG. 8 may be varied (or changed).

(a) of FIG. 9 shows an example of a first image being displayed on the touchscreen of the first display unit 110, when an application, such as a pathfinder, is executed in order to allow the user to be provided with directions to a specific destination in a first display unit 110 of the foldable mobile device shown in FIG. 1. For example, the first image may correspond to a map showing the surrounding area of the point of departure having the requested path marked thereon.

(b) of FIG. 9 shows an example of a second image being displayed on the first and second folding areas 130 and 140 of the second display unit 120, when the user unfolds the foldable mobile device without performing any action, such as a zoom-in operation, while the foldable mobile device is in a state of having a map, which shows the surrounding area of the point of departure having the requested path marked thereon, being displayed on the touchscreen of the first display unit 110, as shown in (a) of FIG. 9. The second image shown in (b) of FIG. 9 may include the first image shown in (a) of FIG. 9 and a third image, which has not been displayed on the first display unit 110. This is because the size of the touchscreen of the first display unit 110 is smaller than the combined (or merged) touchscreen of the first and second folding areas 130 and 140 of the second display unit 120. For example, a map having a path from a point of departure to a point of arrival (or destination) fully marked thereon may be displayed on the second display unit 120 as the second image. In another example, the same image as that shown in (a) of FIG. 9 may be displayed on the touchscreen of the first folding area 130 of the second display unit 120, and a third image that has not been displayed on the first display unit 110 shown in (a) of FIG. 9 may be displayed on the touchscreen of the second folding area 140. At this point, according to the exemplary embodiment of the present specification, if POI information exists in the surrounding area of the requested path in (b) of FIG. 9, the POI information may also be displayed along with the corresponding images.

Meanwhile, in a display state as shown in (a) of FIG. 9, when the user unfolds the foldable mobile device without performing any action, such as a zoom-in operation, instead of (b) of FIG. 9, icons shown in (b) of FIG. 6 may be displayed on the first and second folding areas 130 and 140 of the second display unit 120 as the second image. The icons may correspond to icons of the Home screen, or the icons may correspond to icons of the Menu screen. More specifically, this corresponds to a case when the icons are being set up as the second image corresponding to a predetermined display mode. Herein, the second image corresponding to the predetermined display mode may be automatically set up by the system, or the second image corresponding to the predetermined display mode may be set up by the user using the Menu screen or Menu buttons.

(a) to (c) of FIG. 10 respectively show examples of a first image and a second image, when the foldable mobile device is unfolded after the first image, which is displayed on the first display unit 110, is zoomed-in.

More specifically, (a) of FIG. 10 shows an example of a first image being displayed on the touchscreen of the first display unit 110 in the portrait view mode (or vertical display mode), when an application, such as a pathfinder, is executed in order to allow the user to be provided with directions to a specific destination in a first display unit 110 of the foldable mobile device shown in FIG. 1.

When a zoom-in command is inputted to the first display unit 110 of (a) of FIG. 10 in order to enlarge the first image, an image that is zoomed-in (or enlarged) in accordance with the first zoom-in ratio is displayed on the first display unit 110, as shown in (b) of FIG. 10. At this point, as the first image is enlarged in accordance with the first zoom-in ratio and displayed on the first display unit 110, a portion of the first image disappears from the touchscreen of the first display unit 110. This is because the objects included in the first image are also enlarged in accordance with the first zoom-in ratio.

Since reference may be made to the description given in FIG. 7 on the method of inputting a zoom-in/zoom-out command and setting up first and second zoom-in ratios, detailed description of the same will be omitted in FIG. 10 for simplicity.

When the user unfolds the foldable mobile device, while the foldable mobile device is in a state of having the first image zoomed-in and displayed on the first display unit 110, as shown in (b) of FIG. 10, the first image prior to being zoomed-in is enlarged (or zoomed-in) by the second zoom-in ratio and then displayed on the second display unit 120 as the second image. Herein, if the first zoom-in ratio is equal to the second zoom-in ratio, the size of the objects included in the second image are the same as the size of the objects included in the first image, which is enlarged in the first display unit 110 in accordance with the first zoom-in ratio.

At this point, since the combined touchscreen of the second display unit 120 is larger than the touchscreen of the first display unit 110, a portion of the first image or the entire first image that disappears from the touchscreen of the first display unit 110 due to the zoom-in command may be additionally displayed on the second display unit 120. Additionally, in accordance with the zoom-in/zoom-out position within the touchscreen of the first display unit 110, the second display unit 120 may zoom-in a third image, which has not been displayed on the first display unit 110 shown in (a) of FIG. 10, and may additionally display the zoomed-in third image.

For example, the zoomed-in image identical to that shown in (b) of FIG. 10 is displayed on the touchscreen of the first folding area 130 of the second display unit 120, and a portion of the first image that has disappeared from the first display unit 110 due to the zoom-in operation and a third image that has not been displayed on the first display unit 110 prior to the zoom-in operation may be zoomed-in and then displayed on the second folding area 140.

Meanwhile, in the foldable mobile device of FIG. 7, FIG. 8, and FIG. 10, the second image being displayed on the second display unit 120 may include an image of an important point, to which the user has given significance prior to the zoom-in process, or POI information. For example, even in case the image of an important point, to which the user has given significance prior to the zoom-in process, has disappeared from first display unit 110 due to the zoom-in operation, when the foldable mobile device is unfolded, the image of the important point, to which the user has given significance prior to the zoom-in process, may be zoomed-in so as to be displayed on the second display unit 120. At this point, the image of the important point, to which the user has given significance prior to the zoom-in process, may be displayed at the center of the combined touchscreen of the second display unit 120, or may be displayed on any one of the touchscreen of the first folding area 130 and the touchscreen of the second folding area 140 of the second display unit 120. According to another exemplary embodiment of the present specification, a zoomed-in image respective to a location, at which the zoom-in command is inputted, within the touchscreen of the first display unit 110 may be set up to be displayed on the center of the combined touchscreen of the second display unit 120, when the foldable mobile device is unfolded.

Additionally, according to the exemplary embodiment of the present specification, in the foldable mobile device of FIG. 7, FIG. 8, and FIG. 10, when the first image is zoomed-in by a first zoom-in ratio with respect to a zoom-in command, so as to be displayed on the first display unit 110, the time consumed for performing the corresponding procedure is counted (or timed). And, according to the exemplary embodiment of the present specification, when the user unfolds the foldable mobile device within a predetermined period of time, based upon the image that is zoomed-in by the first zoom-in ratio and displayed on the first display unit 110, the original first image (i.e., the first image prior to being zoomed-in) is zoomed-in by the second zoom-in ratio, so as to be displayed on the second display unit 120 as the second image. If the user does not unfold the foldable mobile device before end of the predetermined time period, the image that has been zoomed-in by the first zoom-in ratio and displayed on the first display unit 110 is recovered to the image prior to being zoomed-in. Thereafter, if the user unfolds the foldable mobile device after the predetermined time period has elapsed (or ended), a second image corresponding to a predetermined display mode is displayed on the second display unit 120. Herein, the second image corresponding to a predetermined display mode may correspond to icons or may correspond to an image being in connection with the first image.

In the description provided above, exemplary embodiments of a foldable mobile device having two folding areas, as shown in FIG. 1, have been described in detail. Hereinafter, exemplary embodiments of a foldable mobile device having three folding areas, as shown in FIG. 3, will be described in detail.

(a) to (c) of FIG. 11 respectively show examples of an image, which is in connection with a first image, being displayed on a second display unit 320 as a second image, when a foldable mobile device is unfolded without any zoom-in operations after an execution image of a specific icon is displayed on a first display unit 310 of the foldable mobile device shown in FIG. 3. More specifically, (a) to (c) of FIG. 11 respectively show exemplary embodiments of the present specification of a case when the second image of a predetermined display mode corresponds to an image being in connection with the first image.

Most particularly, (a) of FIG. 11 shows an example of a first image being displayed on the touchscreen of the first display unit 310, when a location tracking application for searching my current position (or the current position of the user) or someone else's current position (or the current position of another user) is being executed from the first display unit 310 of the foldable mobile device shown in FIG. 3. For example, when my current position has been requested, the Current Position (or 'You are here') being indicated on the map becomes my current position (or the current position of the current user). In another example, when someone else's current position has been requested, the Current Position (or 'You are here') being indicated on the map becomes the current position of the particular person requested by me (i.e., the current user).

(b) of FIG. 11 shows an example of an image being in connection with the first image being displayed on a combined (or merged) touchscreen of the first and second folding areas 330 and 340, among first to third folding areas 330 to 350, of the second display unit 320 as the second image, when the user unfolds the foldable mobile device without performing any zoom-in operations, while the foldable mobile device is in a state of having the current position of an individual (or person) designated by the user being indicated (or marked) on a map, which is displayed on the touchscreen of the first display unit 310, as shown in (a) of FIG. 11. For example, if the right side portion of the foldable mobile device is not fully unfolded, or if the power of the third folding area 350 is turned off, the second image may not be displayed on the third folding area 350. According to the exemplary embodiment of the present specification, in the description of the present specification, in order to save power, at least one of the folding areas among the first to third folding areas 330 to 350 may be independently turned on/off.

(c) of FIG. 11 shows an example of an image being in connection with the first image being displayed on first to third folding areas 330 to 350 of the second display unit 320 as the second image, when the user completely (or fully) unfolds the foldable mobile device without performing any zoom-in operations, while the foldable mobile device is in a state of having the current position of an individual (or person) designated by the user being indicated (or marked) on a map, which is displayed on the touchscreen of the first display unit 310, as shown in (a) of FIG. 11, or when the user completely (or fully) unfolds the foldable mobile device, while the foldable mobile device is in a state of having the second image being displayed on the first and second folding areas 330 and 340 of the second display unit 320, as shown in (b) of FIG. 11.

Referring to (b) and (c) of FIG. 11, the first image that is displayed on the first display unit 310 shown in (a) of FIG. 11 is displayed on the second display unit 320 along with a third image, which has not been displayed on the first display unit 310. At this point, according to the exemplary embodiment of the present specification, since the current location (or position) corresponds to an important point designated by the user, when the foldable mobile device is unfolded, the current location must be displayed on the second display unit 320.

Meanwhile, according to the exemplary embodiment of the present specification, although it is not displayed in the first display unit 310, when POI information designated in advance by the user exists in the surrounding area of the current position, which is marked on the map, a third image including the POI information is displayed on the second display unit 320.

In (b) of FIG. 11, one type of POI information 361 is being displayed on the second folding area 340 of the second display unit 320. In (c) of FIG. 11, one type of POI information 361 is being displayed on the second folding area 340 of the second display unit 320, and two types of POI information 362 and 363 are being displayed on the third folding area 350 of the second display unit 320. (b) and (c) of FIG. 11 respectively show examples of one type or three types of POI information 361, 362, and 363 being located on the right side of the current position.

If at least one type of POI information is located on the left side of the current position, the section displaying the current position may be shifted rightward, in order to display the POI information located on the left side on the second display unit 120, and may then be displayed.

If there is no POI information designated by the user in the surroundings of the current position, the same image as that of (a) of FIG. 11 is displayed on the touchscreen of the first folding area 330 of the second display unit 320, as shown in (b) of FIG. 11, and a third image, which has not been displayed on the first display unit 310 shown in (a) of FIG. 11, may be displayed on the touchscreen of the second folding area 340.

In another example, as shown in (c) of FIG. 11, an image identical to that of (a) of FIG. 11 may be displayed on the touchscreen of the first folding area 330 of the second display unit 320, and a third image that has not been displayed on the first display unit 310 shown in (a) of FIG. 11 may be displayed on the touchscreens of the second and third folding areas 340 and 350 of the second display unit 320.

In yet another example, as shown in (c) of FIG. 11, an image identical to that of (a) of FIG. 11 may be displayed on the touchscreen of the second folding area 340 of the second display unit 320, and a third image that has not been displayed on the first display unit 310 shown in (a) of FIG. 11 may be displayed on the touchscreens of the first and third folding areas 330 and 350 of the second display unit 320.

(a) and (b) of FIG. 12 and FIG. 13 respectively show examples of icons of a Home screen or Menu screen being displayed on a second display unit 320 as a second image, when a foldable mobile device is unfolded without any zoom-in operations after an execution image of a specific icon is displayed on a first display unit 310 of the foldable mobile device shown in FIG. 3. More specifically, (a) and (b) of FIG. 12 and FIG. 13 respectively show exemplary embodiments of the present specification of a case when the second image of a predetermined display mode corresponds to an icon image being in connection with the first image.

Since the content being displayed on the first display unit 310 of (a) of FIG. 12 is identical to that of (a) of FIG. 11, detailed description of the same will be omitted for simplicity.

(b) of FIG. 12 shows an example of icons of the Menu screen being displayed on each touchscreen of the first and second folding areas 330 and 340, among the first to third folding areas 330 to 350, of the second display unit 320 as the second image, when the user unfolds the foldable mobile device without performing any zoom-in operations, while the foldable mobile device is in a state of having the current position of an individual (or person) designated by the user being indicated (or marked) on a map, which is displayed on the touchscreen of the first display unit 310 of the foldable mobile device, as shown in (a) of FIG. 12. For example, if the right side portion of the foldable mobile device is not fully unfolded, or if the power of the third folding area 350 is turned off, the second image may not be displayed on the third folding area 350. According to the exemplary embodiment of the present specification, in the description of the present specification, in order to save power, at least one of the folding areas among the first to third folding areas 330 to 350 may be independently turned on/off.

Figure 13:
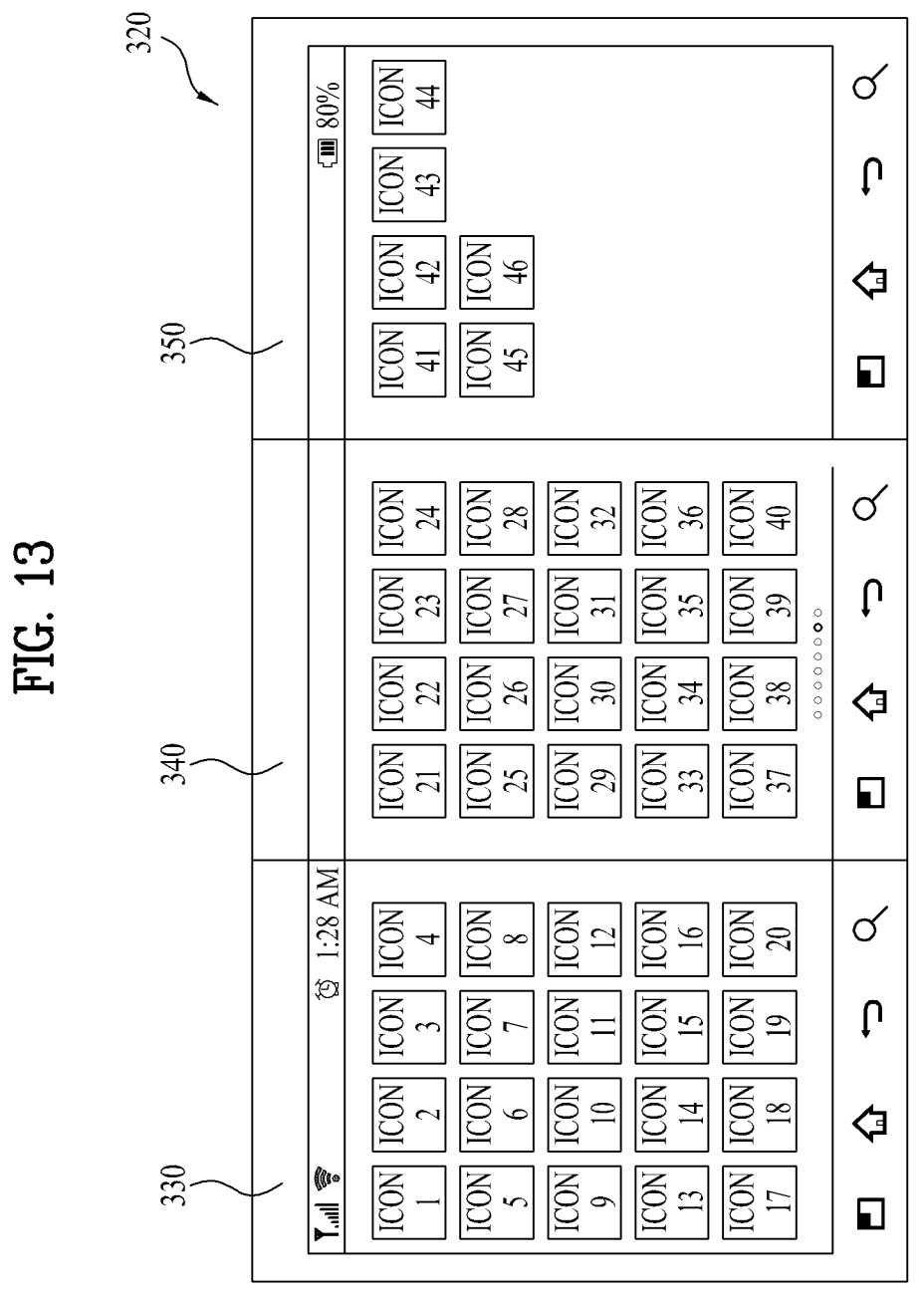

FIG. 13 shows an example of icons of a Menu screen being displayed on each touchscreen of the first to third folding areas 330 to 350 of the second display unit 320 as the second image, when the user completely (or fully) unfolds the foldable mobile device without performing any zoom-in operations, while the foldable mobile device is in a state of having the current position of an individual (or person) designated by the user being indicated (or marked) on a map, which is displayed on the touchscreen of the first display unit 310 of the foldable mobile device, as shown in (a) of FIG. 12, or when the user completely (or fully) unfolds the foldable mobile device, while the foldable mobile device is in a state of having the second image being displayed on the first and second folding areas 330 and 340 of the second display unit 320, as shown in (b) of FIG. 12.

In another example, icons of the same Home screen as the first display unit 310 are displayed on the touchscreen of the first folding area 330 of the second display unit 320, and icons of another page of the Home screen are displayed on the second and third folding areas 340 and 350 of the second display unit 320. In yet another example, icons of the same Home screen as the first display unit 310 may be displayed on the touchscreen of the first folding area 330 of the second display unit 320, and icons of the Menu screen may be displayed on the second and third folding areas 340 and 350 of the second display unit 320. In yet another example, icons of remaining pages of the Home screen, which is displayed on the first display unit 310, may be displayed on at least one of the first folding area 330 to the third folding area 350 of the second display unit 320.

(a) to (d) of FIG. 14 respectively show examples of a first image and a second image, when the first image is zoomed-in and displayed in the first display unit 310 of the foldable mobile device, and when the foldable mobile device is unfolded afterwards.

More specifically, (a) of FIG. 14 shows an example of a first image being displayed on the touchscreen of the first display unit 310, when a location tracking application for searching my current position (or the current position of the user) or someone else's current position (or the current position of another user) is being executed from the first display unit 310 of the foldable mobile device shown in FIG. 3.

When a zoom-in command is inputted in order to enlarge the first image of the first display unit 310 shown in (a) of FIG. 14, the image that is zoomed-in (or enlarged) in accordance with the first zoom-in ratio is displayed on the first display unit 310 as shown in (b) of FIG. 14. At this point, as the first image is enlarged in accordance with the first zoom-in ratio and displayed on the first display unit 310, a portion of the first image disappears from the touchscreen of the first display unit 310. This is because the objects included in the first image are also enlarged in accordance with the first zoom-in ratio.

Since reference may be made to the description given in FIG. 7 on the method of inputting a zoom-in/zoom-out command and setting up first and second zoom-in ratios, detailed description of the same will be omitted in FIG. 14 for simplicity.

When the user partially unfolds the foldable mobile device, while the foldable mobile device is in a state of having the first image zoomed-in and displayed on the first display unit 310, as shown in (b) of FIG. 14, a second image is displayed on the first folding area 330 and the second folding area 340 of the second display unit 320, as shown in (c) of FIG. 14. For example, if the right side portion of the foldable mobile device is not fully unfolded, or if the power of the third folding area 350 is turned off, the second image may not be displayed on the third folding area 350. According to the exemplary embodiment of the present specification, in the present specification, in order to save power, at least one of the folding areas among the first to third folding areas 330 to 350 may be independently turned on/off.

According to an exemplary embodiment of the present specification, the second image being displayed on the second display unit 320 includes at least a portion of the first image, shown in (b) of FIG. 14. According to the exemplary embodiment of the present specification, in the description of the present specification, the first image that is displayed on the first display unit 310, as shown in (a) of FIG. 14, (i.e., the first image prior to being zoomed-in) is zoomed-in by the second zoom-in ratio, so as to be displayed on the first and second folding areas 330 and 340 as the second image.

At this point, according to the exemplary embodiment of the present specification, if the first zoom-in ratio is equal to the second zoom-in ratio, the size of the objects included in the second image are the same as the size of the objects included in the image, which is enlarged in the first display unit 310 in accordance with the first zoom-in ratio.

At this point, a portion of the first image or the entire first image that has disappeared from the touchscreen of the first display unit 310 due to the zoom-in operation may be additionally displayed on the second display unit 320. Additionally, in accordance with the zoom-in/zoom-out position within the touchscreen of the first display unit 310, the second display unit 320 may zoom-in a third image, which has not been displayed on the first display unit 310 shown in (a) of FIG. 14, and may additionally display the zoomed-in third image.

For example, the zoomed-in image identical to that shown in (b) of FIG. 14 is displayed on the touchscreen of the first folding area 330 of the second display unit 320, and a portion of the first image that has disappeared from the first display unit 310 due to the zoom-in operation and/or a third image that has not been displayed on the first display unit 310 prior to the zoom-in operation may be zoomed-in and then displayed on the touchscreen of the second folding area 340.

Additionally, when the user fully (or completely) unfolds the foldable mobile device, while the foldable mobile device is in a state of having the first image being zoomed-in and displayed on the first display unit (310), as shown in (b) of FIG. 14, or when the user fully (or completely) unfolds the foldable mobile device, while the foldable mobile device is in a state of having the second image being displayed on the first and second folding areas 330 and 340 of the second display unit 320, as shown in (c) of FIG. 14, the second image is displayed on the first to third folding areas 330 to 350 of the second display unit 320, as shown in (d) of FIG. 14. According to the exemplary embodiment of the present specification, the second image corresponds to a zoomed-in image of the first image, which is displayed on the first display unit 310, shown in (a) of FIG. 14, (i.e., the first image prior to being zoomed-in), being enlarged by a second zoom-in ratio.

Herein, according to the exemplary embodiment of the present specification, if the first zoom-in ratio is equal to the second zoom-in ratio, the size of the objects included in the second image are the same as the size of the objects included in the first image, which is enlarged in the first display unit 310 in accordance with the first zoom-in ratio.

At this point, a portion of the first image or the entire first image that has disappeared from the touchscreen of the first display unit 310 due to the zoom-in operation may be additionally displayed on the second display unit 320. Additionally, in accordance with the zoom-in/zoom-out position within the touchscreen of the first display unit 310, the second display unit 320 may zoom-in a third image, which has not been displayed on the first display unit 310 shown in (a) of FIG. 14, and may additionally display the zoomed-in third image.

For example, the zoomed-in image identical to that shown in (b) of FIG. 14 is displayed on the touchscreen of the first folding area 330 of the second display unit 320, and a portion of the first image that has disappeared from the first display unit 310 due to the zoom-in operation and/or a third image that has not been displayed on the first display unit 310 prior to the zoom-in operation may be zoomed-in and then displayed on the touchscreen of the second and third folding areas 340 and 350.

In another example, the zoomed-in image identical to that shown in (b) of FIG. 14 is displayed on the touchscreen of the second folding area 340 of the second display unit 320, and a portion of the first image that has disappeared from the first display unit 310 due to the zoom-in operation and/or a third image that has not been displayed on the first display unit 310 prior to the zoom-in operation may be zoomed-in and then displayed on the touchscreen of the first and third folding areas 330 and 350.

(a) of FIG. 15 shows an example of a first image being displayed on the touchscreen of the first display unit 310, when an application, such as a pathfinder, is executed in order to allow the user to be provided with directions to a specific destination in a first display unit 310 of the foldable mobile device shown in FIG. 3. For example, the first image may correspond to a map showing the surrounding area of the point of departure having the requested path marked thereon.

(b) of FIG. 15 shows an example of a second image being displayed on the first and second folding areas 330 and 340 of the second display unit 320, when the user unfolds the foldable mobile device without performing any zoom-in operation, while the foldable mobile device is in a state of having a map, which shows the surrounding area of the point of departure having the requested path marked thereon, being displayed on the touchscreen of the first display unit 310, as shown in (a) of FIG. 15. For example, if the right side portion of the foldable mobile device is not fully unfolded, or if the power of the third folding area 350 is turned off, the second image may not be displayed on the third folding area 350. According to the exemplary embodiment of the present specification, in the description of the present specification, in order to save power, at least one of the folding areas among the first to third folding areas 330 to 350 may be independently turned on/off.

The first image, which is displayed on the first display unit 310 shown in (a) of FIG. 15, and the third image, which has not been displayed on the first display unit 310, may be displayed on the second display unit 320 shown in (b) of FIG. 15. For example, the image identical to that shown in (a) of FIG. 15 may be displayed on the touchscreen of the first folding area 330 of the second display unit 320, and the third image, which has not been displayed on the first display unit 310 shown in (a) of FIG. 15, may be displayed on the second folding area 340.

(c) of FIG. 15 shows an example of a second image being displayed on the first to third folding areas 330 to 350 of the second display unit 320, when the user completely unfolds the foldable mobile device without performing any action, while the foldable mobile device is in a state of having a map, which shows the surrounding area of the point of departure having the requested path marked thereon, being displayed on the touchscreen of the first display unit 310, as shown in (a) of FIG. 15, or when the user completely unfolds the foldable mobile device, while the foldable mobile device is in a state of having the second image being displayed on the first and second folding areas 330 and 340 of the second display unit 320, as shown in (b) of FIG. 15. A third image, which has not been displayed on the first display unit 310 shown in (a) of FIG. 15, may be additionally displayed on the second display unit 320 shown in (c) of FIG. 15.

For example, the image identical to that shown in (a) of FIG. 15 is displayed on the touchscreen of the first folding area 330 of the second display unit 320, and a third image, which has not been displayed on the first display unit 310 shown in (a) of FIG. 15, may be displayed on the touchscreen of the second and third folding areas 340 and 350.

In another example, the image identical to that shown in (a) of FIG. 15 is displayed on the touchscreen of the second folding area 340 of the second display unit 320, and a third image, which has not been displayed on the first display unit 310 shown in (a) of FIG. 15, may be displayed on the touchscreen of the first and third folding areas 330 and 350. Additionally, a map having a path from a point of departure to a point of arrival (or destination) fully marked thereon may be displayed in the first to third folding areas 330 to 350 of the second display unit 320 as the second image.

At this point, according to the exemplary embodiment of the present specification, if POI information exists in the surrounding area of the requested path in (b) of FIG. 15 or (c) of FIG. 15, the POI information may also be displayed along with the corresponding images.

Meanwhile, in a display state as shown in (a) of FIG. 15, when the user unfolds the foldable mobile device without performing any zoom-in operation, instead of (b) of FIG. 15 or (c) of FIG. 15, icons shown in (b) of FIG. 12 or FIG. 13 may be displayed on at least one of the first to third folding areas 330 to 350 of the second display unit 320 as the second image. The icons may correspond to icons of the Home screen, or the icons may correspond to icons of the Menu screen. More specifically, this corresponds to a case when the icons are being set up as the second image corresponding to a predetermined display mode. Herein, the second image corresponding to the predetermined display mode may be automatically set up by the system, or the second image corresponding to the predetermined display mode may be set up by the user using the Menu screen or Menu buttons.

(a) to (d) of FIG. 16 respectively show examples of a first image and a second image, when the user unfolds the foldable mobile device after the first image is zoomed-in in the first display unit 310 of the foldable mobile device.

More specifically, (a) of FIG. 16 shows an example of a first image being displayed on the touchscreen of the first display unit 310, when an application, such as a pathfinder, is executed in order to allow the user to be provided with directions to a specific destination in a first display unit 310 of the foldable mobile device shown in FIG. 3.

When a zoom-in command is inputted in order to enlarge the first image, which is displayed on the first display unit 310 shown in (a) of FIG. 16, the first image that is zoomed-in (or enlarged) in accordance with the first zoom-in ratio is displayed on the first display unit 310, as shown in (b) of FIG. 16. At this point, as the first image is enlarged in accordance with the first zoom-in ratio and displayed on the first display unit

310, a portion of the first image disappears from the touchscreen of the first display unit 310. This is because the objects included in the first image are also enlarged in accordance with the first zoom-in ratio.

Since reference may be made to the description given in FIG. 7 on the method of inputting a zoom-in/zoom-out command and setting up first and second zoom-in ratios, detailed description of the same will be omitted in FIG. 16 for simplicity.

When the user unfolds only a portion of the foldable mobile device (e.g., excluding a right side portion of the foldable mobile device), while the foldable mobile device is in a state of having the first image zoomed-in and displayed on the first display unit 310, as shown in (b) of FIG. 16, a second image is displayed in the first and second folding areas of the second display unit, as shown in (c) of FIG. 16. For example, if the right side portion of the foldable mobile device is not fully unfolded, or if the power of the third folding area 350 is turned off, the second image may not be displayed on the third folding area 350. According to the exemplary embodiment of the present specification, in the description of the present specification, in order to save power, at least one of the folding areas among the first to third folding areas 330 to 350 may be independently turned on/off.

According to an exemplary embodiment of the present specification, the second image being displayed on the second display unit 320 includes at least a portion of the first image, shown in (b) of FIG. 16. According to the exemplary embodiment of the present specification, in the description of the present specification, the first image that is displayed on the first display unit 310, as shown in (a) of FIG. 16, (i.e., the first image prior to being zoomed-in) is zoomed-in by the second zoom-in ratio, so as to be displayed on the first and second folding areas 330 and 340 as the second image.

Herein, according to the exemplary embodiment of the present specification, if the first zoom-in ratio is equal to the second zoom-in ratio, the size of the objects included in the second image are the same as the size of the objects included in the first image, which is enlarged in the first display unit 310 in accordance with the first zoom-in ratio. At this point, a portion of the first image or the entire first image that has disappeared from the touchscreen of the first display unit 310 due to the zoom-in operation may be additionally displayed on the second display unit 320. Additionally, in accordance with the zoom-in/zoom-out position within the touchscreen of the first display unit 310, the second display unit 320 may zoom-in a third image, which has not been displayed on the first display unit 310 shown in (a) of FIG. 16, and may additionally display the zoomed-in third image.

For example, the zoomed-in image identical to that shown in (b) of FIG. 16 is displayed on the touchscreen of the first folding area 330 of the second display unit 320, and a portion of the first image that has disappeared from the first display unit 310 due to the zoom-in operation and/or a third image that has not been displayed on the first display unit 310 prior to the zoom-in operation may be zoomed-in and then displayed in the second folding area 340.

Additionally, when the user fully (or completely) unfolds the foldable mobile device, while the foldable mobile device is in a state of having the first image being zoomed-in and displayed on the first display unit (310), as shown in (b) of FIG. 16, or when the user fully (or completely) unfolds the foldable mobile device, while the foldable mobile device is in a state of having the second image being displayed on the first and second folding areas 330 and 340 of the second display unit 320, as shown in (c) of FIG. 16, the second image is displayed on the first to third folding areas 330 to 350 of the second display unit 320, as shown in (d) of FIG. 16. According to the exemplary embodiment of the present specification, the second image corresponds to a zoomed-in image of the first image, which is displayed on the first display unit 310, shown in (a) of FIG. 16, (i.e., the first image prior to being zoomed-in), being enlarged by a second zoom-in ratio.

Herein, if the first zoom-in ratio is equal to the second zoom-in ratio, the size of the objects included in the second image are the same as the size of the objects included in the first image, which is enlarged in the first display unit 310 in accordance with the first zoom-in ratio.

At this point, a portion of the first image or the entire first image that has disappeared from the touchscreen of the first display unit 310 due to the zoom-in operation may be additionally displayed on the second display unit 320. Additionally, in accordance with the zoom-in/zoom-out position within the touchscreen of the first display unit 310, the second display unit 320 may zoom-in a third image, which has not been displayed on the first display unit 310 shown in (a) of FIG. 16, and may additionally display the zoomed-in third image.

For example, the zoomed-in image identical to that shown in (b) of FIG. 16 is displayed on the touchscreen of the first folding area 330 of the second display unit 320, and a portion of the first image that has disappeared from the first display unit 310 due to the zoom-in operation and/or a third image that has not been displayed on the first display unit 310 prior to the zoom-in operation may be zoomed-in and then displayed on the touchscreen of the second and third folding areas 340 and 350.

In another example, the zoomed-in image identical to that shown in (b) of FIG. 16 is displayed on the touchscreen of the second folding area 340 of the second display unit 320, and a portion of the first image that has disappeared from the first display unit 310 due to the zoom-in operation and/or a third image that has not been displayed on the first display unit 310 prior to the zoom-in operation may also be zoomed-in and displayed on the touchscreen of the first and third folding areas 330 and 350.

Meanwhile, in the foldable mobile device shown in FIG. 14 and FIG. 16, the second image being displayed on the second display unit 320 may include an image of an important point, to which the user has given significance prior to the zoom-in process. More specifically, even in case the image of the important point, to which the user has given significance prior to the zoom-in process, disappears from the first display unit 310 due to the zoom-in operation, when the foldable mobile device is unfolded, the image of the important point, to which the user has given significance prior to the zoom-in process, may be zoomed-in and displayed on the second display unit 320. At this point, the image of the important point, to which the user has given significance prior to the zoom-in process, may be zoomed-in and displayed at the center of the touchscreen of the second folding area 340 of the second display unit 320, or may be displayed on one of the touchscreens of the first folding area 330 and the third folding area 350 of the second display unit 320. According to another exemplary embodiment of the present specification, a zoomed-in image corresponding to a location where the zoom-in command has been inputted to the touchscreen of the first display unit 310 may be set up to be displayed at the center of the touchscreen of the second folding area 340 of the second display unit 320, when the foldable mobile device is unfolded.

Additionally, according to an exemplary embodiment of the present specification, in the foldable mobile device shown in FIG. 14 and FIG. 16, when the first image is zoomed-in by the first zoom-in ratio and displayed on the first display unit 310, the consumed time is counted (or timed). Thereafter, according to the exemplary embodiment of the present specification, if the user unfolds the foldable mobile device within a predetermined period of time, the original first image (i.e., the first image prior to being zoomed-in) is zoomed-in by the second zoom-in ratio, based upon the image zoomed-in by the first zoom-in ratio and displayed on the first display unit 310, thereby being displayed on the second display unit 320 as the second image. However, if the user does not unfold the foldable mobile device until the end of the predetermined period of time, the image that has been zoomed-in by the first zoom-in ratio and displayed on the first display unit 310 is recovered to the original image prior to being zoomed-in. Thereafter, when the user unfolds the foldable mobile device after the predetermined period of time, a second image respective to a predetermined display mode is displayed on the second display unit 320. Herein, the second image respective to the predetermined display mode may correspond to icons or may correspond to an image being in connected with the first image.

Moreover, in the foldable mobile device shown in FIG. 14 and FIG. 16, the zoom-in ratio may be set up differently for a case when the zoomed-in first image is displayed only in the first and second folding areas 330 and 340 of the second display unit 320 and for a case when the zoomed-in first image is displayed in all of the first to third folding areas 330 to 350 of the second display unit 320. According to an exemplary embodiment of the present specification, the zoom-in ratio of the first image, which is to be displayed in all of the first to third folding areas 330 to 350, is set up to be greater than the zoom-in ratio of the first image, which is to be displayed only in the first and second foldable areas 330 and 340. In this case, also, the zoom-in ratio of the first image, which is to be displayed only in the first and second folding areas 330 and 340 of the second display unit 320 shall be equal to or greater than the zoom-in ratio of the first image, which is zoomed-in in the first display unit 310 in accordance with an inputted zoom-in command. The above-described exemplary embodiment of the present specification may be more effective when applied to a case when the first image corresponds to a drawing, photo, webpage, document, and so on, each having a pre-decided horizontal ratio/vertical ratio.

Meanwhile, referring to FIG. 11 to FIG. 16, the second image may be displayed in the first and second folding areas 330 and 340 of the second display unit 320, only when the foldable mobile device is fully (or completely) unfolded. More specifically, when the foldable mobile device is fully (or completely) unfolded, the process of displaying the second image only in the first and second folding areas 330 and 340 of the second display unit 320 may be omitted. This process may be omitted in accordance with the user's selection, when the user seeks to view the second image being displayed on the touchscreen of the first to third folding areas 330 to 350 firsthand, or this process may be omitted when the foldable mobile device is fully unfolded up to the third folding area 350 within a predetermined period of time. Alternatively, this process may also be omitted in accordance with the processing capability of the processor.

FIG. 17 illustrates a flow chart showing a method of controlling a display of the foldable mobile device according to an exemplary embodiment of the present specification.

More specifically, when a specific icon is selected from the first display unit of the foldable mobile device and then executed, the corresponding image respective to the execution of the selected icon is displayed on the first display unit as a first image (S511). Accordingly, the foldable mobile device verifies whether or not a zoom-in command is inputted by the user in order to enlarge the first image, which is displayed on the first display unit (S512). Herein, since the method for inputting the zoom-in command has been described above in FIG. 7, reference may be made to FIG. 7, and, therefore, the detailed description of the same will be omitted herein for simplicity.

When it is verified in step S512 that the zoom-in command has been inputted, the first image is zoomed-in by the first zoom-in ratio and then displayed on the first display unit (S513). In step S513, when the zoomed-in first image is displayed on the first display unit, the timed is counted (or timed) (S514). Thereafter, it is verified whether or not the foldable mobile device is unfolded before the counted (or timed) time reaches the end of a predetermined time period (S515). If the foldable mobile device is not unfolded until the end of the predetermined time period, the first image being zoomed-in and displayed on the first display unit is recovered to its original (or initial) state prior to being zoomed-in, thereby being displayed on the first display unit.

In step S515, when it is verified that the foldable mobile device is unfolded within the predetermined time period, a second image including the first image, which is zoomed-in by the second zoom-in ratio, is displayed on the second display unit (S516). In the above-described process steps, since the method for setting-up the first zoom-in ratio and the second zoom-in ratio has been described above in FIG. 7, reference may be made to FIG. 7, and, therefore, the detailed description of the same will be omitted herein for simplicity.

FIG. 18 is a block diagram illustrating the smart phone 1100, among variable foldable mobile devices according to an embodiment of the present specification. At this point, since the present specification may be applied to all foldable mobile devices including the smart phone, the present specification will not be limited only to the structure of FIG. 18. Referring to FIG. 18, the smart phone 1100 may be connected to an external device (not shown) by using a cellular (or mobile) communication module 1120, a sub-communication module 1130, and a connector 1165. The "external device" may include, for example, at least one of another device, a mobile phone, a smart phone, a tablet PC, and a computer server.

The smart phone 1100 includes two or more display units 1190a and 1190b, and a display controller 1195. Furthermore, the smart phone 1100 may include a controller 1110, the cellular communication module 1120, the sub-communication module 1130, a multimedia module 1140, a camera module 1150, a Global Positioning System (GPS) module 1155, an input/output module 1160, a sensor module 1170, a storing unit 1175, and a power supplying unit 1180. The sub-communication module 1130 may include at least one of a wireless Local Area Network (LAN) module 1131 and a short-range communication module 1132. The multimedia module 1140 may include at least one of a broadcast communication module 1141, an audio play module 1142, and a video play module 1143. The camera module 1150 may include at least one of a first camera 1151 and a second camera 1152. The input/output module 1160 may include at least one of a button 1161, the MIC 1162, a speaker 1163, a vibration motor 1164, the connector 1165, and a keypad 1166.

The controller 1110 includes a Central Processing Unit (CPU) 1111, a Read Only Memory (ROM) 1112 having stored therein a control program for controlling the smart phone 1100, and a Random Access Memory (RAM) 1113 for storing a signal or data input from outside the smart phone 1100 or serving as a memory region for work performed in the smart phone 1100. The CPU 1111 may include at least a single core, dual cores, triple cores, or quad cores. The CPU 1111, the ROM 1112, and the RAM 1113 are connected to one another through an internal bus.

The controller 1110 controls the cellular communication module 1120, the sub-communication module 1130, the multimedia module 1140, the camera module 1150, the GPS module 1155, the input/output module 1160, the sensor module 1170, the storing unit 1175, the power supplying unit 1180, the first display unit 1190a, the second display unit 1190b, and the display controller 1195.

The cellular communication module 1120 allows the smart phone 1100 to be connected to the external device (Particularly, a base station of a cellular system) through mobile communication by using at least one of or a plurality of antennas (not shown) under control of the controller 1110. The cellular communication module 1120 transmits/receives a radio signal for voice communication, video communication, a Short Messaging Service (SMS) message, or a Multimedia Messaging Service (MMS) message to/from a cellular phone, a smart phone, a tablet PC, or another device having a phone number input to the smart phone 1100.

The sub-communication module 1130 may include at least one of the wireless LAN module 1131 and the short-range communication module 1132. For example, the sub-communication module 1130 may include only the wireless LAN module 1131, or only the short-range communication module 1132, or both the wireless LAN module 1131 and the short-range communication module 1132.

The wireless LAN module 1131 may be connected to the Internet in a place where a wireless Access Point (AP) is installed under control of the controller 1110. The wireless LAN module 1131 supports a wireless LAN standard IEEE802.11x of the Institute of Electrical and Electronics Engineers (IEEE). The short-range communication module 1132 may perform near field communication in a wireless manner between the smart phone 1100 and an image forming device under control of the controller 1110. A near field communication scheme may include, for example, Bluetooth or Infrared Data Association (IrDA) and the like.

The smart phone 1100 may include at least one of the cellular communication module 1120, the wireless LAN module 1131, and the short-range communication module 1132 according to its capability.

The multimedia module 1140 may include the broadcast communication module 1141, the audio play module 1142, and the video play module 1143. The broadcast communication module 1141 may receive a broadcast signal (e.g., a TV broadcast signal, a radio broadcast signal, or a data broadcast signal) and broadcast additional information (e.g., an Electric Program Guide (EPG) or an Electric Service Guide (ESG)) output from a broadcasting station through a broadcast communication antenna, under control of the controller 1110. The audio play module 1142 may play a digital audio file (e.g., a file having a file extender of mp3, wma, ogg, or wav) stored or received under control of the controller 1110. The video play module 1143 may play a digital video file (e.g., a file having a file extender of mpeg, mpg, mp4, avi, mov, or mkv) stored or received under control of the controller 1110. The video play module 1143 may also play a digital audio file.

The multimedia module 1140 may include the audio play module 1142 and the video play module 1143 without the broadcast communication module 1141. The audio play module 1142 or the video play module 1143 of the multimedia module 1140 may be included in the controller 1110.

The camera module 1150 may include at least one of the first camera 1151 and the second camera 1152, which capture a still image or a video under control of the controller 1110.

The first camera 1151 and the second camera 1152 may be included in a housing of the smart phone 1100 or may be connected to the smart phone 1100 using a separate connection means. At least one of the first camera 1151 and the second camera 1152 may include an auxiliary light source (e.g., a flash, not shown) for providing a light intensity necessary for capturing an image. According to an embodiment of the present specification, the first camera 1151 may be disposed in a front surface of the smart phone 1100 and the second camera 1152 may be disposed in a rear surface of the smart phone 1100. According to another embodiment of the present specification, the first camera 1151 and the second camera 1152 are positioned adjacent to each other (e.g., an interval between the first camera 1151 and the second camera 1152 is greater than 1 cm and less than 8 cm) to capture a three-dimensional (3D) still image or a 3D video.

The camera module 1150 may detect a motion or a shape of the user through at least one of the first camera 1151 and the second camera 1152, and then it may transmit to the controller 1110 as an input for executing or controlling an application.

For example, the motion of the user may refer to the motion of a hand of the user detected by the first camera 1151 or the second camera 1152. Furthermore, the shape of the user may refer to a face shape of the user detected by the first camera 1151 or the second camera 1152. Moreover, the smart phone 1100 may detect the motion of the user by using another means like an infrared sensor and may execute or control the application in response to the motion.

The GPS module 1155 may receive electric waves from a plurality of GPS satellites (not shown) and calculate a position of the smart phone 1100 by using a time of arrival of the electric waves from the GPS satellite at the smart phone 1100 and GPS parameters.

The input/output module 1160 may include at least one of at least one physical button 1161, the MIC 1162, the speaker 1163, the vibration motor 1164, the connector 1165, and the keypad 1166. The at least one physical button 1161 may be formed in a front surface or a side surface, or a rear surface of the hosing of the smart phone 1100 in a push type or a touch type.

Moreover, the at least one physical button 1161 may include a power/lock button, a volume control button, a menu button, a home button, a back button, and a search button. The MIC 1162 may receive voice or sound to generate an electric signal under control of the controller 1110.

The speaker 1163 may output sound corresponding to various signals (e.g., a radio signal, a broadcast signal, a digital audio file, a digital video file, or a captured picture) of the cellular communication module 1120, the sub-communication module 1130, the multimedia module 1140, or the camera module 1150 external to the smart phone 1100, under control of the controller 1110. The speaker 1163 may output sound corresponding to a function performed by the smart phone 1100 (e.g., a button manipulation sound or a ring back tone corresponding to a phone call). One or more speakers 1163 may be disposed in a proper position or positions of the housing of the smart phone 1100.

For example, the speaker 1163 may include an internal speaker module disposed in a position suitable for approaching ears of the user during phone communication and an external speaker module having a higher output suitable for being used during a reproduction of an audio/video file or watching of broadcasting and disposed in a proper position of the housing of the smart phone 1100.

The vibration motor 1164 may convert an electric signal into mechanical vibration under control of the controller

1110. For example, when the smart phone 1100 in a vibration mode receives a voice call from another device (not shown), the vibration motor 1164 operates. The vibration motor 1164 may be formed as single piece or plural pieces in the housing of the smart phone 1100. For example, the vibration motor 1164 may operate in response to a touch gesture of the user sensed by the first and second display units 1190a and 1190b and continuous motions of a touch sensed by the first and second display units 1190a and 1190b.

The connector 1165 may be used as an interface for connecting the smart phone 1100 with an external device or a power source. Through a wired cable connected to the connector 1165, data stored in the storing unit 1175 of the smart phone 1100 may be transmitted to the external device or data may be received from the external device, under control of the controller 1110. Through a wired cable connected to the connector 1165, power may be input from the power source, or a battery may be charged.

The keypad 1166 may receive key input from a user for controlling the smart phone 1100. The keypad 1166 may include a physical keypad formed in the smart phone 1100 and/or a virtual keypad displayed on the first display unit 1190a and/or the second display unit 1190b. The physical keypad formed in the smart phone 1100 may be excluded according to the capability or structure of the smart phone 1100.

The sensor module 1170 includes at least one sensor for detecting a status of the smart phone 1100. For example, the sensor module 1170 may include at least one of the proximity sensor for detecting an approaching action to the smart phone 1100, an ambient light sensor for detecting the amount of ambient light around the smart phone 1100, and a motion sensor for detecting a motion of the smart phone 1100 (e.g., rotation of the smart phone 1100, or an absolute/relative movement of at least one panel configuring the smart phone 1100, or acceleration or vibration applied to the smart phone 1100). Each sensor of the sensor module 1170 may detect a status of the smart phone 1100, generate a signal corresponding to the detection, and transmit the signal to the controller 1110. According to the capability of the smart phone 1100, sensors of the sensor module 1170 may be added to or removed from the sensor module 1170.

The storing unit 1175 may store a signal, information or data input/output according to an operation of the cellular communication module 1120, the sub-communication module 1130, the multimedia module 1140, the camera module 1150, the GPS module 1155, the input/output module 1160, the sensor module 1170, the first display unit 1190a or the second display unit 1190b, under control of the controller 1110. The storing unit 1175 may store a control program for controlling operations of the smart phone 1100 or the controller 1110.

The smart phone 1100 may store a control program and applications for controlling of the smart phone 1100 or the controller 1110. The term "storing unit" may include the storing unit 1175, the ROM 1112 or the RAM 1113 included in the controller 1110, or a memory card mounted in the smart phone 1100, such as a Secure Digital (SD) card or a memory stick. The storing unit may include a non-volatile memory, a volatile memory, a Hard Disk Drive (HDD), or a Solid State Drive (SSD).

The power supply unit 1180 may supply power to one battery or a plurality of batteries disposed in the housing of the smart phone 1100, under control of the controller 1110. The one battery or the plurality of batteries supplies or supply power to the controller 1110 and each component module of the smart phone 1100. The power supply unit 1180 may supply power input from an external power source to the smart phone 1100 through a wired cable connected to the connector 1165.

The first display unit 1190a and the second display unit 1190b is a display device displaying various applications (e.g., phone call, data transmission, broadcasting, and camera and so forth) which can be executed by the controller 1110 and providing a user interface configured to adapt to the various application. The first and second display units 1190a and 1190b may be input at least one touch gesture through a body of the user (e.g., fingers including a thumb) or a sensible input means (e.g., a stylus pen). The user interface may include a predetermined touch area, a soft key and a soft menu. The first and second display units 1190a and 1190b may transmit an electrical signal corresponding to at least one touch gesture being input through the user interface to the display controller 1195. Furthermore, the first and second display unit 1190a and 1190b may detect continuous touch motions and transmit electrical signals corresponding to continuous or discontinuous touch motions to the display controller 1195. The first and second display units 1190a and 1190b may be implemented in, for example, a resistive type, a capacitive type, an infrared type or an acoustic wave type.

The display controller 1195 converts an electrical signal received from the first display unit 1190a and the second display unit 1190b into a digital signal (e.g., X and Y coordinates), and transmits the digital signal to the controller 1110. The controller 1110 may control the first display unit 1190a and the second display unit 1190b by using the digital signal received from the display controller 1195. For example, the controller 1110 may cause a short-cut icon displayed on the first display unit 1190a and the second display unit 1190b to be selected or executed in response to a touch. The display controller 1195 may be included in the controller 1110.

The touch gesture according to the present specification is not limited to a direct contact between the first and second display units 1190a and 1190b and a user's body or a touchable input means and may include a non-contact (for example, a case where a detectable interval between the first and second display units 1190a and 1190b and the user's body or the touchable input means is 1 cm or shorter). The detectable interval of the first and second display units 1190a and 1190b may be changed according to a capability or a structure of the smart phone 1100.

In an exemplary embodiment, the touch gesture may include all types of user gestures which can be detected by the portable device through a direct contact or a close approach to the touch screen. For example, the touch gesture corresponds to a user's action of selecting one position or a plurality of continuous positions on the touch screen by using a finger of a right hand or left hand (particular, an index finger), a thumb, or an object (for example, a stylus pen) which can be detected by the touch screen, and may include actions such as a touch, a contact, a release of the touch, a tap, a contact and rotate, a pinch, a spread, a touch drag and the like. Here, the touch drag corresponds to a gesture of moving a finger or a thumb in a predetermined direction in a state where the finger, the thumb, or a stylus pen contacts the touch screen, and may include, for example, gestures such as a touch and drag, a flick, a swipe, a slide, a sweep and the like. A contact state with the touch screen may include a state where the finger, the thumb, or the stylus pen directly contacts the touch screen or closely approaches the touch screen without a direct contact.

The smart phone 1100 is a device for executing an application, a widget, and a function which is stored in the storage unit and can be executed by the controller 1110 through the touch screen. In general, the touch screen provides application, widgets, functions, and graphic objects (that is, soft key or short-cut icon) corresponding to a group thereof, and the portable device executes a corresponding application, widget, or function in response to the detection of the touch gesture of the user on each graphic object.

Here, the widget refers to a mini application which is downloaded and used by the user or can be generated by the user, and includes, for example, a weather widget, a stock widget, a calculator widget, an alarm clock widget, a dictionary widget and the like. A short-cut icon for executing the widget may provide simple advance information through a corresponding widget application. For example, an icon of the weather widget simply provides a current temperature and a weather symbol and a widget application executed through a touch of the icon provides much more information such as weather in each period/area. The application in this specification includes a widget based application and a non-widget based application.

Meanwhile, a first image may be displayed in the first display unit 1190*a* of the smart phone 1100 in accordance with the execution of a specific application. At this point, if the smart phone 1100 is unfolded without any zoom-in operations, a second image corresponding to a predetermined mode (or display mode) is displayed on the second display unit 1190*b*. Herein, the second image corresponding to the predetermined display mode may correspond to icons of a Home screen or a Menu screen, or may correspond to an image being in connection with the first image. And, if the first image corresponds to an image including a map, and if the second image corresponding to the predetermined display mode corresponds to an image being in connection with the first image, a third image including point of interest (POI) information may also be displayed on the second display unit 1190*b*. Meanwhile, in a state when the first image is displayed on the first display unit 1190*a* of the smart phone 1100, if a zoom-in command is inputted by the user in order to enlarge the first image, due to the control of the controller 1110, the first display unit 1190*a* enlarges the first image by a first zoom-in ratio and displays the enlarged first image. At this point, since the method for inputting the zoom-in command has already been described above in FIG. 7, and since reference may be made to FIG. 7, detailed description of the same will hereinafter be omitted for simplicity. For example, when a gesture of spreading out two fingers in inputted to the first display unit 1190*a*, the controller 1110 recognizes (or identifies) the inputted gesture as the zoom-in command.

After the first image, which is enlarged by the first zoom-in ratio, is displayed on the first display unit 1190*a* before a predetermined time is elapsed, the controller 1110 determines whether or not the smart phone 1100 is being unfolded. If the smart phone 1100 is not unfolded until the predetermined time is elapsed, due to the control of the controller 1100, the first display unit 1190*a* recovers the displayed first image, which is zoomed-in to the first zoom-in ratio, to its initial state prior to being zoomed-in (or enlarged) and displays the recovered first image.

Meanwhile, if the smart phone 1100 is unfolded before the predetermined time is elapsed (or expired), due to the control of the controller 1110, the second display unit 1190*b* zooms-in the original first image to a second zoom-in ratio and displays the newly zoomed-in image as the second image. For example, the second display unit 1190*b* displays the first image, which is zoomed-in to a second zoom-in ratio that is equal to the first zoom-in ratio or greater than the first zoom-in ratio, as a second image. Since the method for setting-up (or determining) the first zoom-in ratio and the second zoom-in ratio has already been described above in FIG. 7, and since reference may be made to FIG. 7, detailed description of the same will hereinafter be omitted for simplicity.

At this point, the sensor module 1170 includes at least one sensor detecting the state of the smart phone 1100, and, for example, the foldable mobile device senses the folded/unfolded state of the smart phone 1100. And, based upon the sensing result of the sensor module 1170, the controller 1110 controls the display of the first and second display units 1190*a* and 1190*b*.

According to an exemplary embodiment of the present specification, if the smart phone 1100 corresponds to a foldable mobile device having two folding areas, as shown in FIG. 1, the second image is displayed on a first folding area and a second folding area of the second display unit 1190*b*. According to the exemplary embodiment of the present specification, specific parts that have not been described herein follow the description given with reference to FIG. 5 to FIG. 10.

According to another exemplary embodiment of the present specification, if the smart phone 1100 corresponds to a foldable mobile device having three folding areas, as shown in FIG. 3, the second image is displayed in at least two folding areas, among the first to third folding areas, of the second display unit 1190*b*. Herein, according to the exemplary embodiment of the present specification, portions of the present specification that are not described herein shall follow the contents described in FIG. 11 to FIG. 16.

If a flexible mobile device can be folded/unfolded, the above-described exemplary embodiments of the present specification may also be applied to the flexible mobile device.

As described above, when the foldable mobile device according to the present specification is in a folded state, by zooming-in an image that is being displayed on the first display unit in accordance with a zoom-in command, and by allowing an image that is zoomed-in at a zoom-in ratio, which is equal to or greater than the zoom-in ratio of the zoomed-in image being displayed on the first display unit, to be displayed on the second display device, when the foldable mobile device is unfolded, the user's needs and request to view an image that is more enlarged than the original image through a larger display screen may be quickly and easily satisfied.

It will be apparent to those skilled in the art that various modifications and variations can be made in the present specification without departing from the spirit or scope of the specifications. Thus, it is intended that the present specification covers the modifications and variations of this specification provided they come within the scope of the appended claims and their equivalents.

What is claimed is:

1. A foldable mobile device, comprising:
 a first display unit configured to include a display section having a touch screen, to display a first image in accordance with an execution of at least one application while the foldable mobile device is in a folded state, and to display a first zoomed-in first image when a zoom-in command is inputted, wherein the first zoomed-in image is the first image that is zoomed-in by a first zoom-in ratio;
 a second display unit configured to include at least two display sections having the touch screen, respectively, to display a second image when the foldable mobile device is unfolded without having any zoom-in operations on the first display unit, and to display a third image including the first zoomed-in first image when the first zoomed-in first image is displayed on the first display unit and then the foldable mobile device is unfolded within a predetermined time period, wherein the third image is the first image that is zoomed-in by a second zoom-in ratio that is equal to or greater than the first zoom-in ratio; and a controller configured to determine the first zoom-in ratio and the second zoom-in ratio, and to control the foldable mobile device so that the first image is zoomed-in by the determined first zoom-in ratio and the second zoom-in ratio, wherein, when the foldable mobile device is unfolded, the at least two display sections of the second display unit are disposed in parallel on a surface and are divided physically, and the first display unit is positioned at a rear surface of one of the at least two display sections in the second display unit, and wherein a display mode of the second display unit is determined based on a type of the first image and a display mode of the first display unit.

2. The foldable mobile device of claim 1, wherein, when the first zoomed-in first image is displayed on the first display unit and then the foldable mobile device is unfolded after the predetermined time period, the controller controls the foldable mobile device so that the second image is displayed on the second display unit.

3. The foldable mobile device of claim 1, wherein the second image corresponds to at least one icon or an image connected with the first image.

4. The foldable mobile device of claim 1, wherein, when the first image includes a map, the controller controls the foldable mobile device so that Point Of Interest (POI) information can be included in at least one of the second image and the third image.

5. The foldable mobile device of claim 1, wherein the controller controls the foldable mobile device so that, among the first image being displayed on the first display unit, at least one portion of an image that has disappeared from the display section of the first display unit due to a zoom-in operation can be included in the third image.

6. The foldable mobile device of claim 1, wherein the controller controls the foldable mobile device so that, among the first image being displayed on the first display unit, an image respective to a position to which the zoom-in command is inputted can be included in the third image.

7. The foldable mobile device of claim 1, wherein the controller determines the first zoom-in ratio based on the zoom-in command, and wherein the controller determines the second zoom-in ratio based on the first zoom-in ratio.

8. The foldable mobile device of claim 7, wherein the controller determines the second zoom-in ratio by additionally applying at least one of the type of the first image being displayed on the first display unit, the display mode of the first display unit, and the display mode of the second display unit.

9. The foldable mobile device of claim 8, wherein, when the second display unit has two or more display sections, the display mode of the second display unit is divided into a portrait view mode (or vertical display mode) and a landscape view mode (or horizontal display mode), wherein, in the portrait view mode, among two or more display sections, at least one display section is vertically positioned on a left side, and at least another one display section is vertically positioned on a right side, and wherein, in the landscape view mode, among two or more display sections, at least one display section is positioned on an upper portion, and at least another one display section is positioned on a lower portion.

10. The foldable mobile device of claim 9, wherein the second display unit displays the second image in any one of the landscape view mode and the portrait view mode based on the type of the first image and the display mode of the first display unit.

11. The foldable mobile device of claim 10, wherein the first image corresponds to an image having its horizontal ratio and vertical ratio determined in advance, wherein the second display unit displays the second image in the landscape view mode when the first zoomed-in first image is displayed on the first display unit in the portrait view mode, and wherein the second display unit displays the second image in the portrait view mode when the first zoomed-in first image is displayed on the first display unit in the landscape view mode.

12. The foldable mobile device of claim 11, wherein, when the first image corresponds to an image having its horizontal ratio and vertical ratio undetermined, the second display unit displays the second image in any one of the landscape view mode and the portrait view mode, regardless of the display mode of the first display unit.

13. The foldable mobile device of claim 12, wherein the first image having its horizontal ratio and vertical ratio determined in advance corresponds to at least one of a drawing and a photo, and wherein the first image having its horizontal ratio and vertical ratio undetermined corresponds to a map.

14. The foldable mobile device of claim 1, wherein, when the second display unit has two or more display sections, each size of the two or more display sections is determined in accordance with a folding position of the foldable mobile device, and wherein, among the two or more display sections, at least one display section has the same size as the display section of the first display unit.

15. The foldable mobile device of claim 1, wherein the foldable mobile device includes a flexible mobile device that can be folded and unfolded.

16. The foldable mobile device of claim 1, wherein the first zoom-in ratio is determined either in advance or in accordance with a spreading range of user's two fingers when the zoom-in command is inputted using the user's two fingers.

17. A method for controlling a display of a foldable mobile device including a first display unit and a second display unit, the method comprising:

displaying a first image in accordance with an execution of at least one application on the first display unit when the foldable mobile device is in a folded state;

displaying a second image on the second display unit when the foldable mobile device is unfolded without zoom-in operations on the first display unit;

displaying a first zoomed-in first image on the first display unit when a zoom-in command is inputted on the first display unit in the folded state of the foldable mobile device, wherein the first zoomed-in first image is the first image that is zoomed by a first zoom-in ratio; and displaying a third image including the first zoomed-in first image on the second display unit when the first zoomed-in first image is displayed on the first display unit and then the foldable mobile device is unfolded within a predetermined time period, wherein the third image is the first image that is zoomed-in by a second zoom-in ratio that is equal to or greater than the first zoom-in ratio, wherein the first display unit includes a display section having a touch screen and the second display unit includes at least two display sections having the touch screen, respectively, wherein, when the foldable mobile device is unfolded, the at least two display sections of the second display unit are disposed in parallel on a surface and are divided physically, and the first display unit is positioned at a rear surface of one of the at least two display sections in the second display unit, and wherein a display mode of the second display unit is determined based on a type of the first image and a display mode of the first display unit.

18. The method of claim 17, wherein, when the first image includes a map, at least one of the second image and the third image further includes Point Of Interest (POI) information.

19. The method of claim 17, wherein, when the first zoomed-in first image is displayed on the first display unit and then the foldable mobile device is unfolded after the predetermined time period, the controller controls the foldable mobile device so that the second image is displayed on the second display unit.

20. The method of claim 17, wherein, among the first image being displayed on the first display unit, at least one portion of an image that has disappeared from the display section of the first display unit due to a zoom-in operation is included in the third image.

* * * * *